(12) United States Patent
Gerber et al.

(10) Patent No.: US 10,968,968 B2
(45) Date of Patent: Apr. 6, 2021

(54) BRAKE CLIP FOR DISC BRAKE ASSEMBLY AND DISC BRAKE ASSEMBLY INCLUDING SUCH A BRAKE CLIP

(71) Applicants: ZF ACTIVE SAFETY US INC., Livonia, MI (US); ZF ACTIVE SAFETY GMBH, Koblenz (DE)

(72) Inventors: Kraig Gerber, Livonia, MI (US); Manuel Barbosa, Livonia, MI (US); Harry Miller, Livonia, MI (US); Jon Wemple, Livonia, MI (US); Daniel Schwarz, Koblenz (DE); Marco Becker, Koblenz (DE); Florian Rossinger, Koblenz (DE); Antonio Eduardo De Morais, Livonia, MI (US); Chad Brizendine, Livonia, MI (US)

(73) Assignees: ZF Active Safety US Inc., Livonia, MI (US); ZF Active Safety GmbH, Koblenz (DE)

( * ) Notice: Subject to any disclaimer, the term of this patent is extended or adjusted under 35 U.S.C. 154(b) by 121 days.

(21) Appl. No.: 15/554,254

(22) PCT Filed: Mar. 3, 2016

(86) PCT No.: PCT/US2016/020599
§ 371 (c)(1),
(2) Date: Aug. 29, 2017

(87) PCT Pub. No.: WO2016/141135
PCT Pub. Date: Sep. 9, 2016

(65) Prior Publication Data
US 2018/0038431 A1 Feb. 8, 2018

Related U.S. Application Data

(60) Provisional application No. 62/128,791, filed on Mar. 5, 2015.

(51) Int. Cl.
*F16D 65/097* (2006.01)
*F16D 55/2265* (2006.01)
(Continued)

(52) U.S. Cl.
CPC ....... *F16D 65/0972* (2013.01); *F16D 55/227* (2013.01); *F16D 55/2265* (2013.01); *F16D 2065/1396* (2013.01)

(58) Field of Classification Search
CPC .............. F16D 65/0006; F16D 65/005; F16D 65/0972; F16D 65/122; F16D 55/2265; F16D 55/227; F16D 2065/1396
See application file for complete search history.

(56) References Cited

U.S. PATENT DOCUMENTS 4,049,087 A 9/1977 Heinz et al.
RE30,255 E 4/1980 Rath et al.
(Continued)

FOREIGN PATENT DOCUMENTS

CN 1384904 A 12/2002
CN 1802519 A 7/2006
(Continued)

OTHER PUBLICATIONS

Chinese First Office Action, Application No. 201680013769.4, dated Nov. 12, 2018.
(Continued)

*Primary Examiner* — Melody M Burch
(74) *Attorney, Agent, or Firm* — Robert James Harwood

(57) ABSTRACT

A disc brake assembly includes a brake clip having a U-shaped section and at least one extension portion. The U-shaped section has a base leg and opposing upper and lower legs extending from the base leg. The at least one extension portion has an application portion, a transition portion with first and second legs, and a bend connecting the
(Continued)

first and second legs. The transition portion extends in a first direction from a side of the U-shaped section. The first and second legs extend in a direction other than the first direction. The bend redirects the application portion from a second direction to a third direction. The second direction is angled from the first direction.

9 Claims, 18 Drawing Sheets

(51) Int. Cl.
*F16D 55/227* (2006.01)
*F16D 65/02* (2006.01)

(56) References Cited

U.S. PATENT DOCUMENTS

| | | | |
|---|---|---|---|
| 4,371,060 A | 2/1983 | Iwata | |
| 5,232,882 A | 8/1993 | Yoshimoto et al. | |
| 5,687,817 A | 11/1997 | Kobayashi et al. | |
| 5,699,882 A | 12/1997 | Ikegami et al. | |
| 5,901,815 A | 5/1999 | Kobayashi et al. | |
| 5,941,348 A | 8/1999 | Matsumoto et al. | |
| 5,947,233 A | 9/1999 | Kobayashi et al. | |
| 6,223,866 B1 | 5/2001 | Giacomazza | |
| 6,286,636 B1 | 9/2001 | Iwata | |
| 6,478,122 B1 | 11/2002 | Demoise, Jr. et al. | |
| 6,481,544 B2 | 11/2002 | Brecht et al. | |
| 6,527,090 B1 | 3/2003 | Barillot et al. | |
| 7,040,464 B1 | 5/2006 | Andrews | |
| 7,086,506 B2 | 8/2006 | Wemple et al. | |
| 7,299,903 B2 | 11/2007 | Rockwell et al. | |
| 7,578,374 B2 | 8/2009 | Takeo et al. | |
| 7,644,809 B2 | 1/2010 | Cortinovis et al. | |
| 7,784,591 B2 | 8/2010 | Franz et al. | |
| 2005/0274579 A1 | 12/2005 | Nogiwa | |
| 2007/0017756 A1 | 1/2007 | Takeo et al. | |
| 2007/0029148 A1* | 2/2007 | Jedele | F16D 65/0972 188/250 G |
| 2009/0277729 A1 | 11/2009 | Kim | |
| 2010/0243389 A1* | 9/2010 | Miura | F16D 65/0972 188/206 R |
| 2011/0168503 A1 | 7/2011 | Chelaidite | |
| 2012/0186917 A1 | 7/2012 | Gutelius | |
| 2013/0192938 A1 | 8/2013 | Miller et al. | |
| 2017/0299004 A1 | 10/2017 | Mallmann et al. | |
| 2018/0163800 A1* | 6/2018 | Barbosa | F16D 55/2265 |

FOREIGN PATENT DOCUMENTS

| | | |
|---|---|---|
| CN | 107076231 A | 8/2017 |
| DE | 102012016737 A1 | 2/2014 |
| EP | 1600653 A1 | 11/2005 |
| JP | 08226470 A | 9/1996 |
| JP | 11082570 A | 3/1999 |
| JP | 3213191 B2 | 1/2001 |
| JP | 2003139171 A | 5/2003 |
| JP | 2003222171 A | 8/2003 |
| JP | 2012117656 A | 6/2012 |
| TW | 396119 B | 7/2000 |
| WO | 2016046160 A1 | 3/2016 |

OTHER PUBLICATIONS

EP Communication, Application No. 16759464.7, dated Sep. 6, 2018.
1st Chinese Office Action, Application No. CN201380006604.0, dated Apr. 12, 2016.
PCT International Search Report and the Written Opinion, Application No. PCT/US2013/022862, dated Jun. 14, 2013.

* cited by examiner

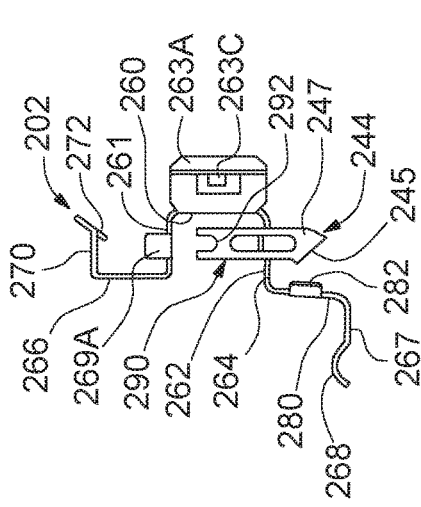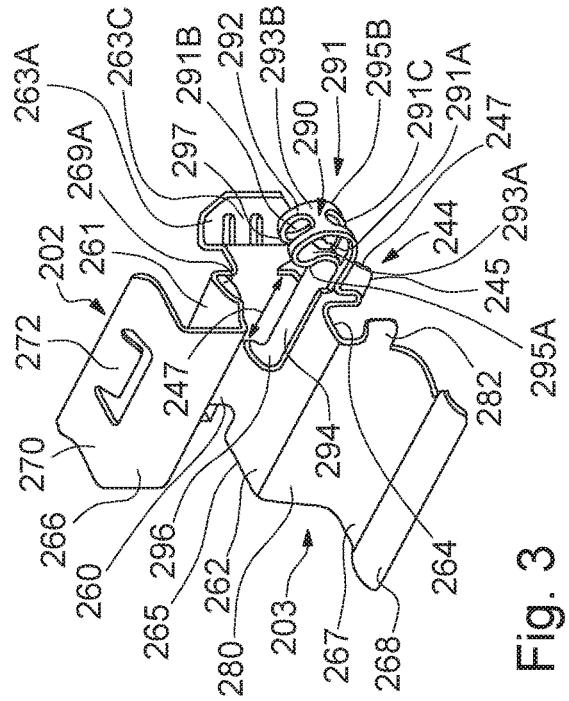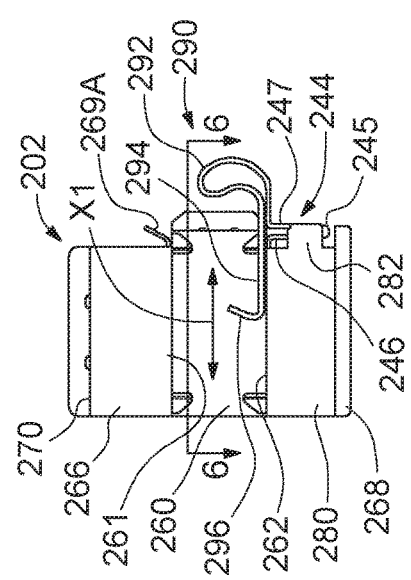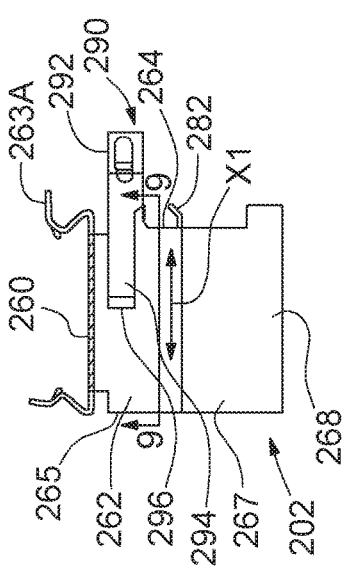

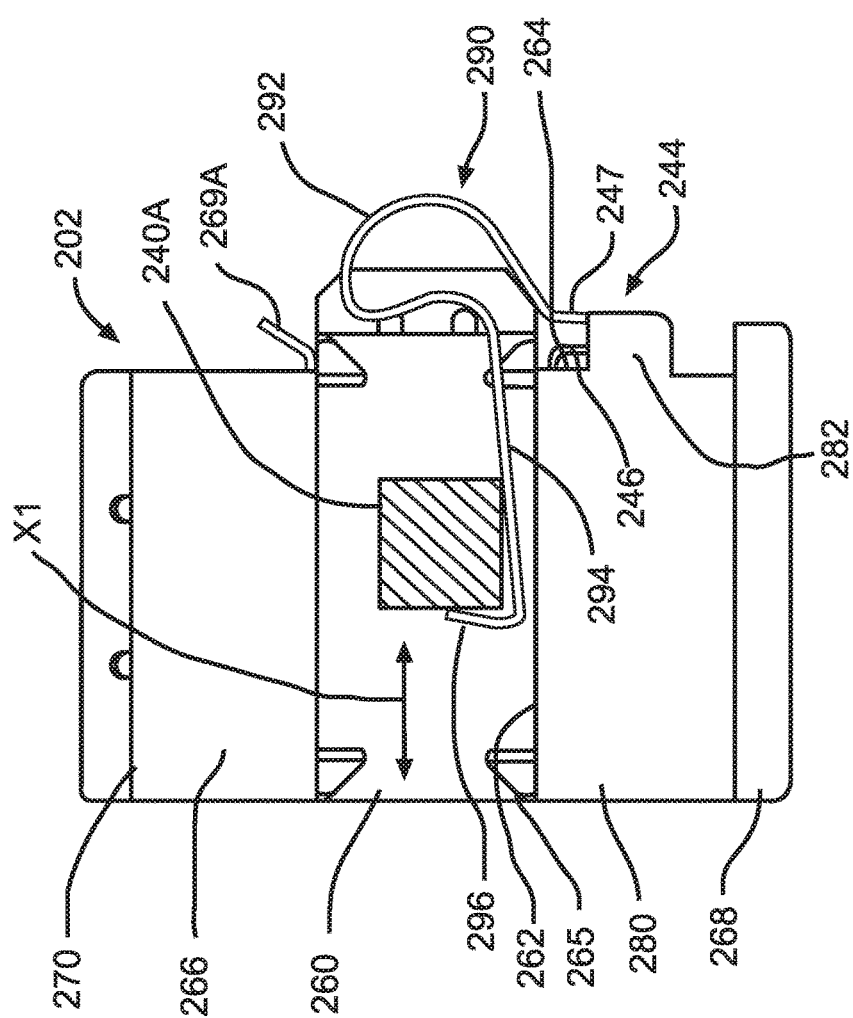

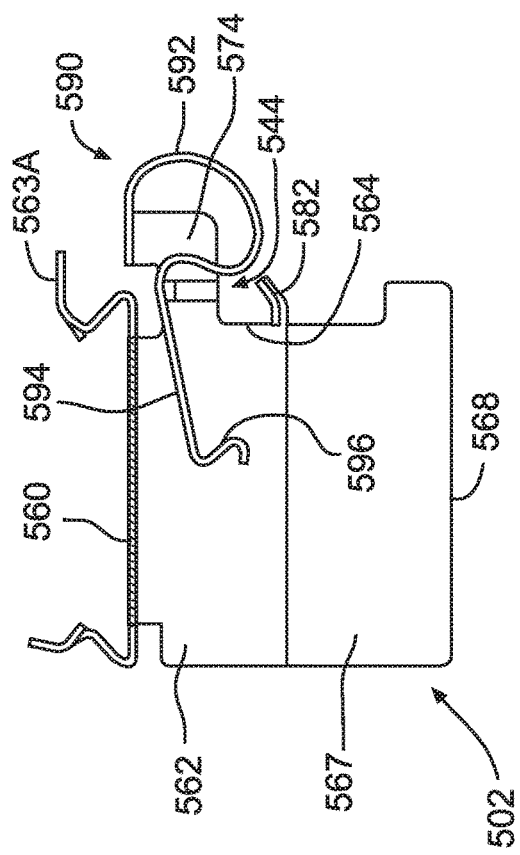
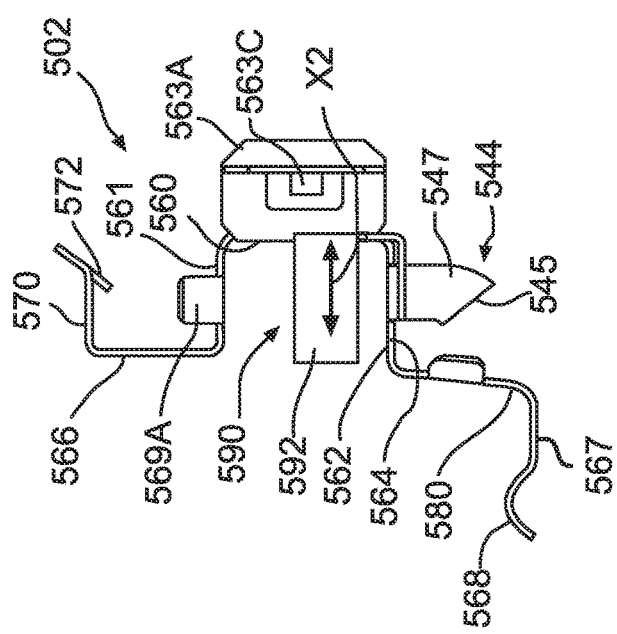
FIG. 15
FIG. 14

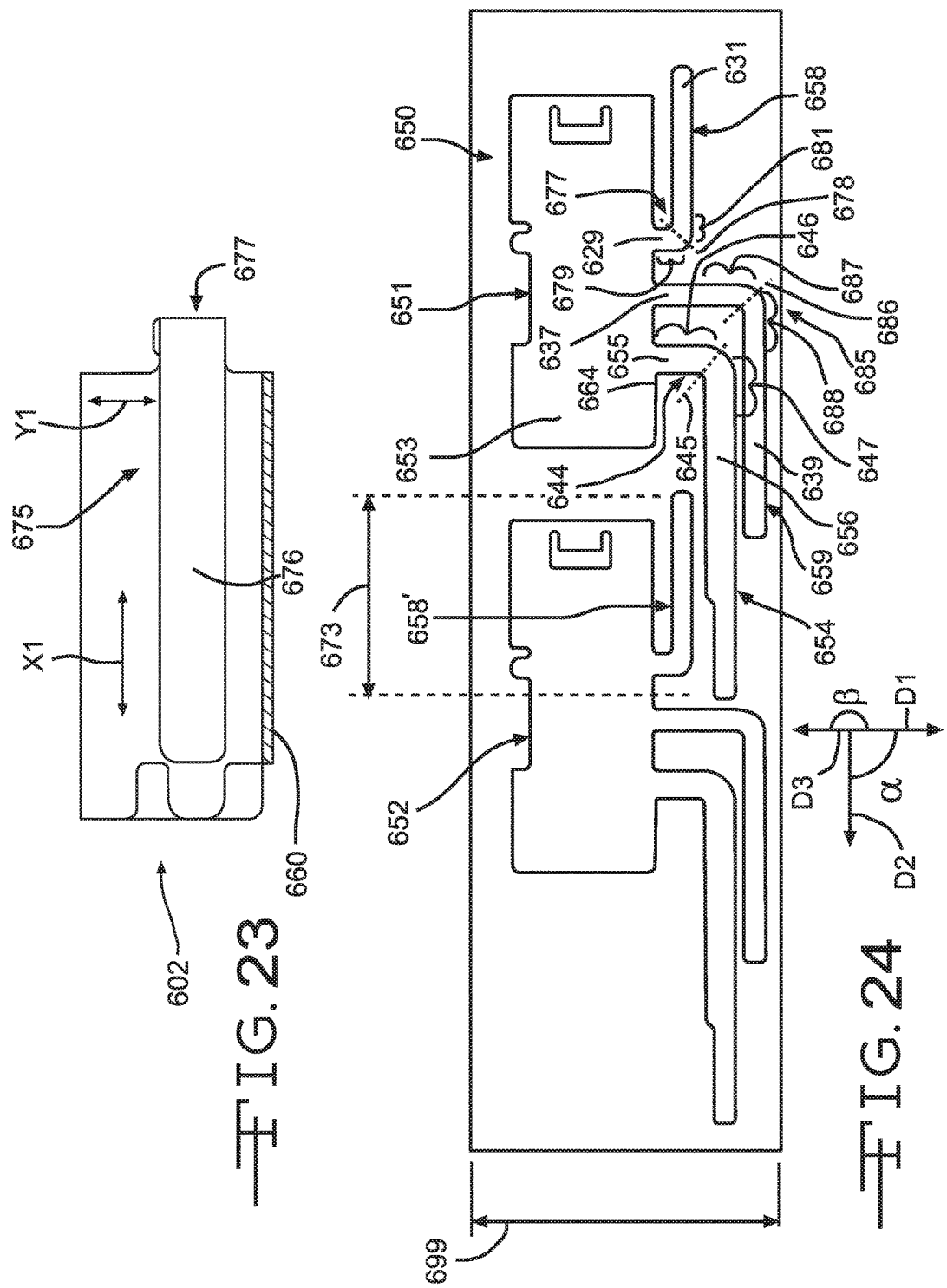

BRAKE CLIP FOR DISC BRAKE ASSEMBLY AND DISC BRAKE ASSEMBLY INCLUDING SUCH A BRAKE CLIP

CROSS REFERENCE TO RELATED APPLICATION

This application claims priority to, and the benefit of, U.S. Provisional Application Ser. No. 62/128,791, filed Mar. 5, 2015, the full disclosure of which is incorporated herein by reference in entirety.

BACKGROUND OF INVENTION

This invention relates in general to vehicle disc brake assemblies and in particular to an improved structure for a brake clip for use in such a disc brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefore, are well known in the art.

A typical disc brake assembly includes a brake rotor which is secured to a wheel of the vehicle for rotation therewith. The disc brake assembly further includes a caliper assembly that is slidably supported on pins secured to an anchor bracket. The anchor bracket is secured to a non-rotatable component of the vehicle, such as the axle flange or steering knuckle, which is connected to the vehicle frame. The caliper assembly includes a pair of brake pads which are disposed on opposite sides of the brake rotor. The brake pads are connected to one or more hydraulically or pneumatically actuated pistons for movement between a non-braking position and a braking position, wherein the brake pads are moved into frictional engagement with the opposed braking surfaces of the brake rotor. For example, when the operator of the vehicle depresses the brake pedal, the piston urges the brake pads from the non-braking position to the braking position so as to frictionally engage the opposed braking surfaces of the brake rotor and thereby slow or stop rotation of the associated wheel of the vehicle.

When the disc brake assembly is not actuated, the brake pads are normally spaced apart from the opposite sides of the rotor. Because the brake pads are not positively engaged with the rotor, the brake pads are free to move relative to other brake and vehicle components during vehicle operation. As a result, vehicle induced vibration loads are known to cause undesirable rattle or other noises between the brake pads and the other brake components. To prevent this from occurring, it is known to provide a brake clip between the anchor bracket and the brake pad.

The brake clip may have a retraction portion that provides a retraction load that retracts or pulls the brake pad from contact with the rotor when the brake pedal is released. The brake pad wears from a new pad condition to a worn pad condition with repeated use—i.e., engagement with the rotor. However, as the brake pad wears, the retraction load provided by the retraction clip increases. Thus, it would be desirable to have a brake clip with a retraction portion that reduces changes in the retraction load of the brake clip as the brake pad wears.

SUMMARY OF INVENTION

This invention relates to a brake clip for use in a disc brake assembly.

According to one embodiment, a disc brake assembly may comprise, individually and/or in combination, one or more of the following features: an anchor bracket, a brake pad, and a brake clip. The anchor bracket has a channel and the brake pad has a guide rail disposed within the channel. The brake clip is disposed between the anchor bracket and the brake pad and has a U-shaped section and at least one extension portion. The U-shaped section has a base leg and opposing upper and lower legs extending from the base leg. The at least one extension portion has an application portion, a transition portion with first and second legs, and a bend connecting the first and second legs. The transition portion extends in a first direction from a side of the U-shaped section. The first and second legs extend in a direction other than the first direction. The bend redirects the application portion from a second direction to a third direction. The second direction is angled from the first direction.

According to another embodiment, a disc brake assembly may comprise, individually and/or in combination, one or more of the following features: a brake clip. The brake clip has a U-shaped section and at least one extension portion. The U-shaped section has a base leg with opposing upper and lower legs extending from the base leg. The at least one extension portion has an application portion, a transition portion with first and second legs, a bend connecting the first and second legs, and a spring portion connecting the transition and application portions. The transition portion extends in a first direction from a side of the U-shaped section. The first and second legs extend in a direction other than the first direction. The bend redirects the application portion from a second direction to a third direction. The second direction is angled from the first direction. The spring portion has a plurality of bridging portions interspaced with a plurality of openings, first and second spring legs, and an apex between the first and second spring legs. A first opening of the plurality of openings is in the first spring leg and a second opening of the plurality of openings is in the second spring leg. A first bridging portion of the plurality of bridging portion is at the apex.

According to another embodiment, a method of producing a brake clip adapted for use with a disc brake assembly may comprise, individually and/or in combination, one or more of the following features: cutting, from a material strip, a material blank having a blank body and at least one strip portion, bending a U-shaped section from the blank body, and bending extension portions from the at least one strip portion. The strip portions have first portions extending in a first direction from the blank body and second portions extending in a second direction. The second direction is at an angle to the first direction. The U-shaped section has a base leg with opposing upper and lower legs extending from the base leg. Each of the extension portions has transition and application portions. The transition portion is formed from the first portion and has first and second legs in a direction other than the first direction. The application portion is formed from the second portion and is formed in a third direction.

A potential advantage of an embodiment of the brake clip is reducing changes in a retraction load of the brake clip.

Other advantages of this invention will become apparent to those skilled in the art from the following detailed description of the preferred embodiments, when read in light of the accompanying drawings.

BRIEF DESCRIPTION OF DRAWINGS

FIG. 3 is a perspective view of a first embodiment of a brake clip in accordance with the present invention.

FIG. 4 is a front elevation view of the first embodiment of the brake clip illustrated in FIG. 3.

FIG. 5 is an end elevation view of the first embodiment of the brake clip illustrated in FIG. 3.

FIG. 6 is a sectional view taken along line 6-6 of FIG. 4.

FIG. 7 is a front elevation view of the first embodiment of the brake clip illustrated in FIG. 3 in an installed position.

FIG. 14 is an end elevation view of the fourth embodiment of the brake clip illustrated in FIG. 12.

FIG. 15 is a sectional view taken along line 15-15 of FIG. 13.

FIG. 23 is a sectional view taken along line 23 of FIG. 20.

FIG. 24 is a plan view of a material strip used in fabrication of the fifth embodiment of the brake clip illustrated in FIG. 18.

DETAILED DESCRIPTION OF THE PREFERRED EMBODIMENTS

Figure 1:
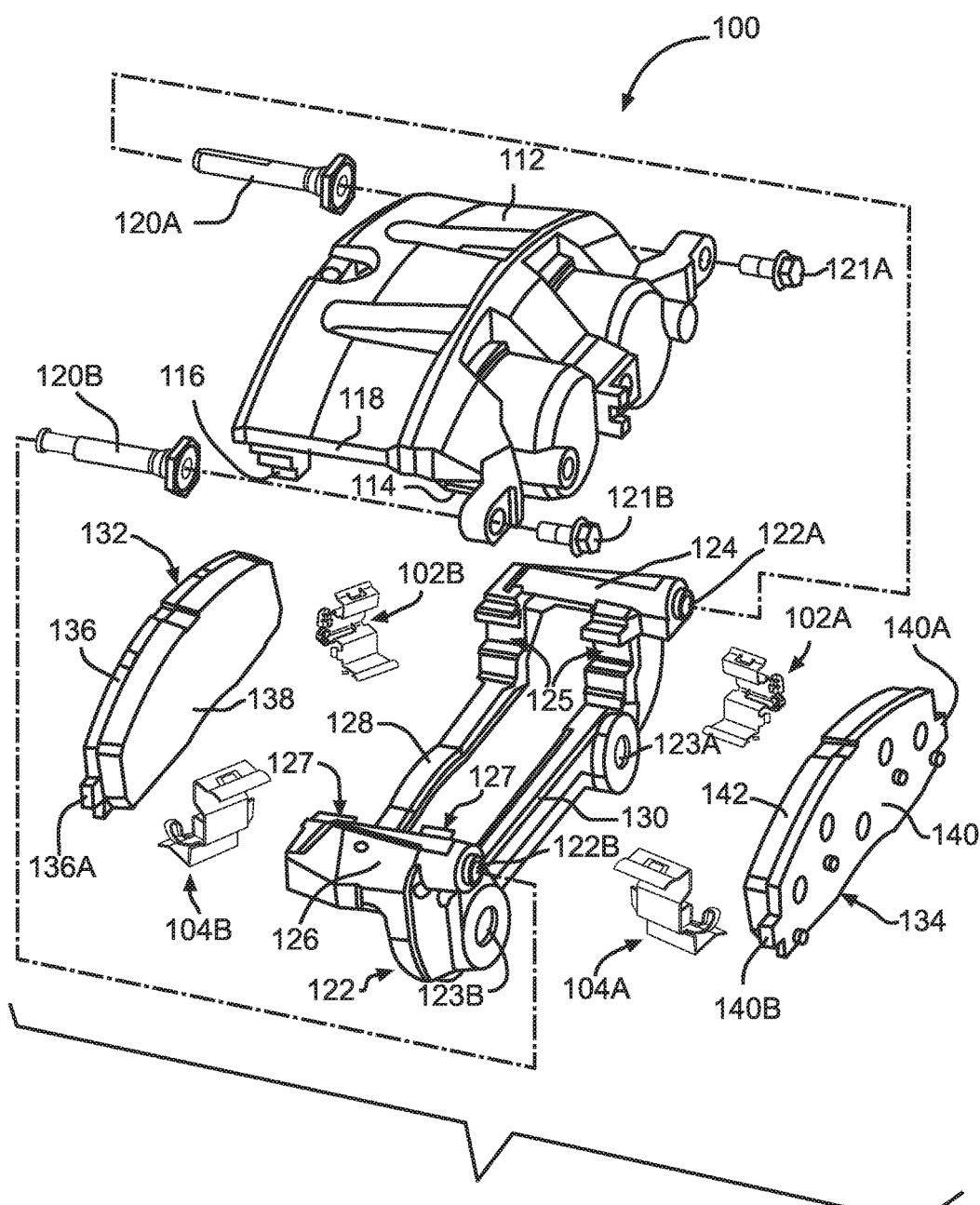
FIG. 1 is an exploded perspective view of a prior art disc brake assembly.

Referring now to FIG. 1, there is illustrated a perspective view of selected components of a prior art disc brake assembly, indicated generally at 100, including inboard and outboard first brake clips 102A and 102 B, respectively, and inboard and outboard second brake clips 104A and 104B, respectively, shown in an uninstalled position thereon. As will be readily understood by one skilled in the art, although only the inboard first brake clip 102A is described and illustrated herein, the outboard first brake clip 102B, as well as the inboard and outboard second brake clips 104A and 104B, respectively, are similar.

The prior art disc brake assembly 100 that is illustrated in FIG. 1 is a well known "Collete" sliding type of disc brake assembly, such as that shown in U.S. Pat. No. 5,323,882 to Waterman et al., U.S. Pat. No. Re 30,255 to Rath et al., and U.S. Patent Publication No. 2013/0192938 to Miller et al., the disclosures of all of these patents and publication are herein incorporated by reference in entirety. The general structure and operation of the disc brake assembly 100 is conventional in the art. Thus, only those portions of the disc brake assembly 100 which are necessary for a full understanding of this invention will be explained and illustrated in detail. Also, although this invention will be described and illustrated in connection with the particular disc brake assembly 100 disclosed herein, it will be appreciated that this invention may be used in connection with other types of disc brake assemblies. For example, the invention may be used in conjunction with other single piston, twin piston, single opposed piston and twin opposed piston disc brake assemblies, such as shown for example in U.S. Pat. No. 7,784,591 to Franz et al., the disclosure of which is incorporated by reference in entirety herein.

The prior art disc brake assembly 100 includes a generally C-shaped caliper 112, an anchor bracket 122, and outboard and inboard brake pads 132 and 134, respectively. The disc brake assembly 100 is illustrated as being adapted for use on a front left wheel of a vehicle, although such is not required.

The caliper 112 includes an inner section 114 and an outer section 116 that are connected by a bridge section 118. The caliper 112 is slidably supported on the anchor bracket 122 by first and second guide pins 120A and 120B, respectively, that extend into the anchor bracket 122. The caliper 112 can be secured to the first and second guide pins 120A and 120B, respectively, by first and second guide pin bolts 121A and 121B, respectively. The anchor bracket 122 is, in turn, secured to a stationary component of a vehicle, such as for example an axle flange (not shown) or a steering knuckle (also not shown).

The anchor bracket 122 includes first and second spaced apart non-threaded openings 122A and 122B, respectively, and first and second spaced apart threaded openings 123A and 123B, respectively. The first and second non-threaded openings 122A and 122B, respectively, are each adapted to receive one of the associated first or second guide pins 120A or 120B, respectively, and the first and second threaded openings 123A and 123B, respectively, are each adapted to receive a mounting bolt (not shown). The mounting bolts extend through the first and second threaded openings 123A and 123B, respectively, and are received in threaded openings provided in a stationary vehicle component (not shown), thereby securing the anchor bracket 122 to the stationary vehicle component. Alternatively, other known securing methods can be used to secure the brake caliper 112 to the anchor bracket 122 and/or to secure the anchor bracket 122 to the stationary vehicle component if so desired.

The anchor bracket 122 includes a pair of axially and outwardly extending first and second arms 124 and 126, respectively, that are interconnected at their outboard ends by an outer tie bar 128 and interconnected at their inboard ends by an inner tie bar 130. The second arm 126 is at the second end of the disc brake assembly 100 and the first arm 124 is at the first end of the disc brake assembly 100. Alternatively, the anchor bracket 122 can be constructed to include only one of the inner tie bar 130 or the outer tie bar 128 if so desired.

Each of the first and second arms 124 and 126, respectively, includes first and second spaced apart notches or channels, indicated respectively generally at 125 and 127, formed therein (only the first channels 125 are clearly shown, but the second channels 127 are preferably identical to the first channels 125). In particular, the first channels 125 are provided on an inner wall of arm 124 and are parallel to one another, and the second channels 127 are provided on an inner wall of arm 126 and are parallel to one another. The first and second channels 125 and 127, respectively, slidably support the outboard brake pad 132 and the inboard brake pad 134 having the inboard and outboard first brake clips 102A and 102B, respectively, and the inboard and outboard second brake clips 104A and 104B, respectively, assembled therewith. Thus, the first and second channels 125 and 127, respectively, are adapted to receive the associated inboard and outboard first brake clips 102A and 102B, respectively, and the associated inboard and outboard first brake clips 104A and 104B, respectively, prior to assembly of the outboard and inboard brake pads 132 and 134, respectively, to the anchor bracket 122.

The outboard brake pad 132 includes an outboard backing plate 136 and an outboard friction pad 138. The outboard backing plate 136 includes opposite ends having outwardly projecting outboard guide rails 136A (only one guide rail is shown) formed thereon. The outboard guide rails 136A are configured to support the outboard brake pad 132 for sliding movement within the first and second channels 125 and 127, respectively, of the anchor bracket 122. Similarly, the inboard brake pad 134 includes an inboard backing plate 140 and an inboard friction pad 142. The inboard backing plate 140 includes opposite ends having outwardly projecting first and second inboard guide rails 140A and 140B, respectively, formed thereon. The first and second inboard guide rails 140A and 140B, respectively, are configured to support the inboard brake pad 134 for sliding movement within the first and second channels 125 and 127, respectively, of the anchor bracket 122. Alternatively, the outboard brake pad 132 can be supported on a brake piston of the disc brake assembly 100 while the inboard brake pad 134 can be supported on the inboard leg portion 116 of the caliper 112. In the illustrated embodiment, the outboard guide rails 136A and the first and second inboard guide rails 140A and 140B, respectively, each preferably have a generally rectangular cross sectional shape, although such is not required.

Figure 2:
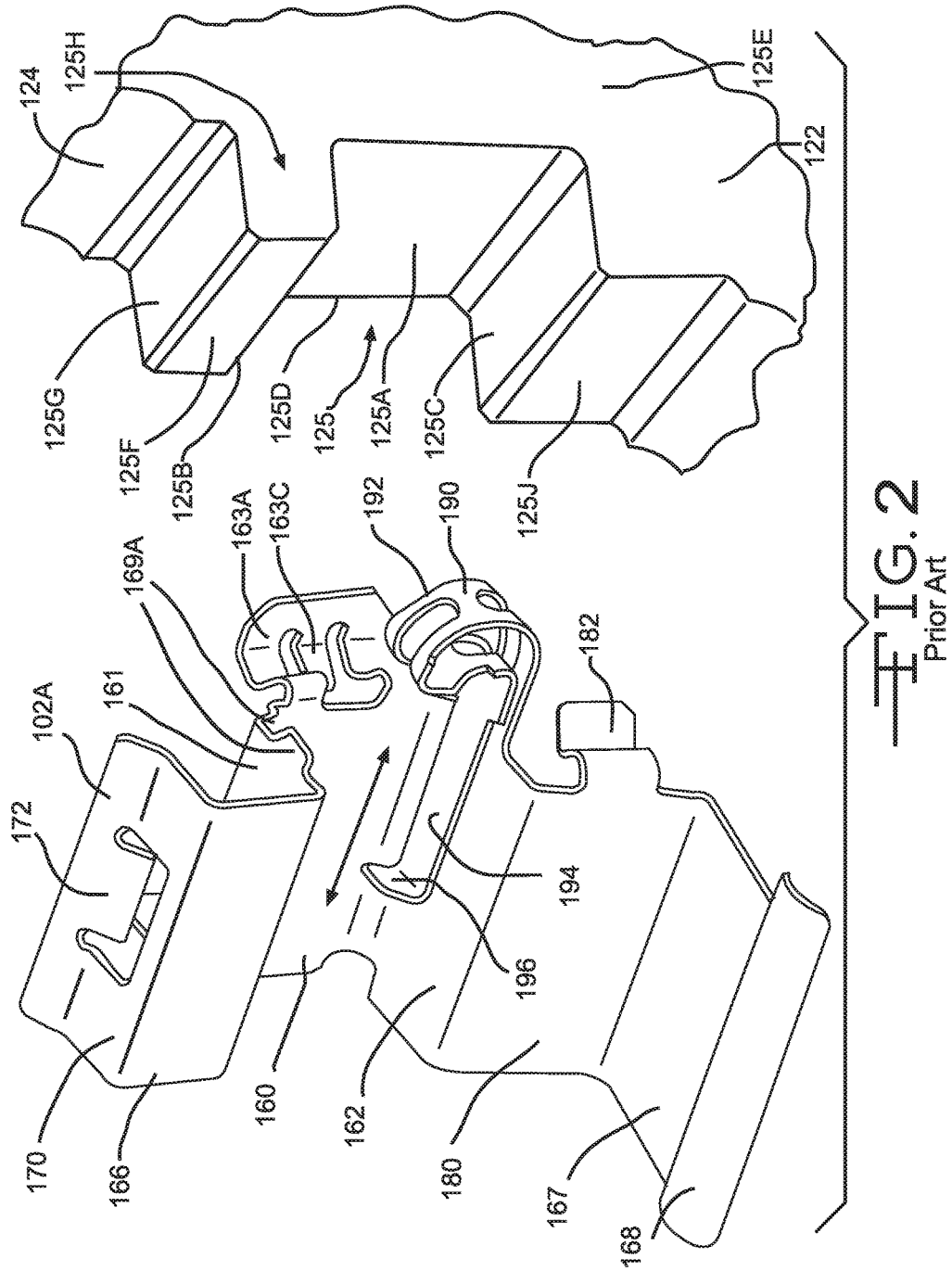
FIG. 2 is a perspective view of a prior art brake clip for use with the prior art disc brake assembly illustrated in FIG. 1.

Referring now to FIG. 2, the inboard first brake clip 102A includes a U-shaped section having a substantially flat base leg 160. A first or upper leg 161 and a second or lower leg 162 extend outwardly in a generally perpendicular manner from opposing edges of the base leg 160. The upper leg 161 and the lower leg 162 are flat structures that are parallel with one another and perpendicular with the base portion 160, thereby forming a rectangular shape that generally corresponds with the shape of the first channel 125, although such is not required. As such, when the inboard first brake clip 102A is installed on the anchor bracket 122, the base leg 160 extends along and is seated against a rear surface 125A of the first channel 125. The upper leg 161 extends along and is generally seated against or otherwise in contact with an upper surface 125B of the first channel 125, although such is not required. The lower leg 162 extends along and is generally seated against or otherwise in contact with a lower surface 125C of the first channel 125, although such is also not required.

The inboard first brake clip 102A preferably includes at least one retaining member 163A. The retaining member 163A is a resilient portion that extends rearward from opposite edges of the base leg 160. It should be appreciated that the retaining member 163A can be formed by a stamping operation or, alternatively, may be separate components that are secured thereto if so desired. The retaining member 163A may include a lip, a protrusion, or any other structural features that are configured to engage the anchor bracket 122 and secure the inboard first brake clip 102A thereto. For example, the illustrated retaining member 163A includes a "punch-out" tab 163C. In operation, when the inboard first brake clip 102A is installed on the anchor bracket 122, the retaining member 163A extends along and engages first and second side surfaces 125D and 125E, respectively, of the anchor bracket 122 to assist in securing the inboard first brake clip 102A to the anchor bracket 122.

The inboard first brake clip 102A further includes an upper installation tab 169A, although such is not required. The upper installation tab 169A extends outwardly from a side of the upper leg 161 and is angled upwardly therefrom. The upper installation tab 169A is configured to align the first inboard guide rail 140A provided on the backing plate 140 for insertion into the first channel 125 during installation of the inboard brake pad 134 on the anchor bracket 122. It should be appreciated that the upper installation tab 169A can be otherwise configured in any suitable manner.

The upper leg 161 of the inboard first brake clip 102A further preferably includes first and second support legs 166 and 170, respectively. The first support leg 166 extends from the upper leg 161. The first support leg 166 is configured to generally correspond with and extend adjacent to a front surface 125F of the anchor bracket 122 when the inboard first brake clip 102A is installed on the anchor bracket 122, although such is not required. As such, the first support leg 166 is disposed between the anchor bracket 122 and the backing plate 140 of the inboard brake pad 134 when the associated components of the disc brake assembly 100 are assembled.

The second support leg 170 may further include a retention tab 172. The illustrated retention tab 172 extends downward from the second support leg 170 and in a forward direction toward the first support leg 166. Thus, when the inboard first brake clip 102A is installed on the anchor bracket 122, the retention tab 172 engages a top surface 125G of an upper ledge 125H at a location that is offset or otherwise spaced from the rear surface 125A of the first channel 125 toward the front surface 125F. This configuration resists pivotal movement of the inboard first brake clip 102A away from the first channel 125. Thus, it should be appreciated that the top surface 125G of the upper ledge 125H need not include a groove or the like to receive the retention tab 172 as a result of the offset engagement location. The retention tab 172 can be any structure, including but not limited to the retention tabs described and illustrated above.

The lower leg 162 of the inboard first brake clip 102A further preferably includes a lower abutment leg 180. The lower abutment leg 180 can be a resilient member that extends downwardly in a generally perpendicular manner from the lower leg 162, although such a configuration is not required. Thus, when the inboard first brake clip 102A is installed on an anchor bracket 122, the lower abutment leg 180 extends adjacent a lower contact surface 125J of the anchor bracket 122 and is preferably in contact with at least a portion of the lower contact surface 125J.

The lower abutment leg 180 further preferably includes a retention member 182 provided on an outboard side thereof, although such is not required. The illustrated retention member 182 is a resilient projection that extends from the lower abutment leg 180 in a rearward direction along the side surface 125E of the anchor bracket 122. The retention member 182 opposes a retraction load that is created by retraction of the backing plate 140 relative to the anchor bracket 122. Thus, the retention member 182 prevents the backing plate 140 from pulling the inboard first brake clip 102A toward a rotor (not shown) as the friction material of the inboard brake pad 134 wears from use. Further, the retention member 182 may assist in alignment of the lower abutment leg 180 on the lower contact surface 125J of the anchor bracket 122 when the inboard first brake clip 102A is installed thereon. It should be appreciated that the retention member 182 may include a lip, a protrusion, a tab, or any other structural feature that is configured to contact the side surface 125E of the anchor bracket 122 if so desired.

An extension leg 167, in turn, extends from the lower abutment leg 180. The extension leg 167 is a resilient member that extends outwardly from the lower leg 162. An end portion of the extension leg 167 may include a lip portion 168 having a semi-circular cross-sectional shape or any other desired cross-sectional shape. The lip portion 168 is provided to assist in deflection of the extension leg 167.

The inboard first brake clip 102A further includes an extension portion 190. As shown, the extension portion 190 is a retractor clip that extends along the lower leg 162 of the inboard first brake clip 102A. The extension portion 190 includes a spring portion 192, an application portion 194 applying a spring force from the spring portion 192, and a contact lip 196. The spring portion 192 connects the application portion 194 to an outboard edge of the lower leg 162 of the inboard first brake clip 102A. The spring portion 192 is embodied as a plurality of elastically deformable spring arms that allow the application portion 194 to move in a side-to-side motion along the lower leg 162, as indicated by the arrow shown in FIG. 2. It should be appreciated, however, that the spring portion 192 can be any elastically deformable structure as desired. Thus, the extension portion 190 is configured to retract the inboard brake pad 134 from contact with a brake rotor (not shown) when a brake pedal (also not shown) has been released.

Referring now to FIGS. 3-6, there is illustrated an embodiment of a brake clip, indicated generally at 202, produced in accordance with the present invention and for use with a disc brake assembly, such as for example the prior art disc brake assembly illustrated in FIG. 1. In FIGS. 3-6 the brake clip 202 is shown in the "free" or uninstalled state.

The brake clip 202 includes a body section, indicated generally at 203 and having a substantially flat base leg 260. A first or upper leg 261 and a second or lower leg 262 extend outwardly in a generally perpendicular manner from opposing edges of the base leg 260. The upper leg 261 and the lower leg 262 are flat structures that are substantially parallel with one another and perpendicular with the base portion 260, thereby forming a rectangular shape that generally corresponds with the shape of a channel (not shown) formed in an arm of an anchor bracket (not shown), although such is not required. Alternatively, the upper leg 261 and the lower leg 262 may be other than flat.

The anchor bracket is a conventional type known to those skilled in the art. For example, the anchor bracket may be the prior art anchor bracket 122. When the brake clip 202 is installed on the anchor bracket, the base leg 260 extends along and is seated against a rear surface of a channel. The upper leg 261 extends along and is generally seated against or otherwise in contact with an upper surface of the channel, although such is not required. The lower leg 262 extends along and is generally seated against or otherwise in contact with a lower surface of the channel, although such is also not required.

In the illustrated embodiment, the brake clip 202 preferably includes first retaining member 263A. The first retaining member 263A is a resilient portion that extends rearward from opposite edges of the base leg 260. It should be appreciated that the first retaining member 263A can be formed by a stamping operation or, alternatively, the first retaining member 263A may be a separate component that is secured to the base leg 260. The first retaining member 263A may include a lip, a protrusion, or any other structural features that are configured to engage the anchor bracket and secure the brake clip 202 thereto. For example, the illustrated first retaining member 263A includes a "punch-out" tab 263C. In operation, when the brake clip 202 is installed on the anchor bracket, the first retaining member 263A extends along and engages side surfaces of the anchor bracket to assist in securing the brake clip 202 to the anchor bracket.

The brake clip 202 further includes an upper installation tab 269A, although such is not required. The upper installation tab 269A extends outwardly from a side of the upper leg 261 and is angled upwardly therefrom. The upper installation tab 269A is configured to align a guide rail that is provided on a backing plate (not shown) for insertion into the channel during installation of a brake pad (not shown) on the anchor bracket. The brake pad and backing plate are of a conventional type known to those skilled in the art. For example, the brake pad may be the prior art inboard brake pad 134 and the backing plate may be the prior art backing plate 140. It should be appreciated that the upper installation tab 269A can be otherwise configured in any suitable manner.

In the illustrated embodiment, the upper leg 261 of the brake clip 202 further preferably includes first and second support legs 266 and 270, respectively. The first support leg 266 extends from the upper leg 261. The first support leg 266 is configured to generally correspond with and extend adjacent to a front surface of the anchor bracket when the brake clip 202 is installed on the anchor bracket, although such is not required. As such, the first support leg 266 is disposed between the anchor bracket and the backing plate of the brake pad when the associated components of the disc brake assembly are assembled.

The second support leg 270 may further include a second retention tab 272. The illustrated second retention tab 272 extends from the second support leg 270 toward the first support leg 266. Thus, when the brake clip 202 is installed on the anchor bracket, the second retention tab 272 engages a top surface of an upper ledge at a location that is offset or otherwise spaced from a rear surface of the channel toward a front surface. This configuration resists pivotal movement of the brake clip 202 away from the channel.

The lower leg 262 of the brake clip 202 further includes a lower abutment leg 280. The lower abutment leg 280 can be a resilient member that extends downwardly in a generally perpendicular manner from the lower leg 262, although such a configuration is not required. Thus, when the brake clip 202 is installed on the anchor bracket, the lower abutment leg 280 extends adjacent a lower contact surface of the anchor bracket and is preferably in contact with at least a portion of the lower contact surface.

The lower abutment leg 280 further preferably includes a third retention member 282 provided on an outboard side thereof, although such is not required. The illustrated third retention member 282 is a resilient projection that extends from the lower abutment leg 280 along a side surface of the anchor bracket. The third retention member 282 opposes a retraction load that is created by retraction of the backing plate relative to the anchor bracket. Thus, the third retention member 282 prevents the backing plate from pulling the brake clip 202 toward a rotor (not shown) as the friction material of the brake pad wears from use. Further, the third retention member 282 may assist in alignment of the lower abutment leg 280 on the lower contact surface of the anchor bracket when the brake clip 202 is installed thereon. It should be appreciated that the third retention member 282 may include a lip, a protrusion, a tab, or any other structural feature that is configured to contact the side surface of the anchor bracket if so desired.

An extension leg 267, in turn, extends from the lower abutment leg 280. The extension leg 267 is a resilient member that extends outwardly from the lower leg 262. An end portion of the extension leg 267 may include a lip portion 268 having a semi-circular cross-sectional shape or any other desired cross-sectional shape. The lip portion 268 is provided to assist in deflection of the extension leg 267.

The brake clip 202 further includes an extension portion, indicated generally at 290 and extending from the body section 203. As illustrated, the extension portion 290 is a retractor clip that extends from a first side 264 of the lower leg 262. The extension portion 290 includes a spring portion 292, an application portion 294, and a contact lip 296. The application portion 294 applies the spring force generated by the spring portion 292 and extends in a direction transverse to the lower leg 262. As illustrated, the application portion 294 extends generally from the first side 264 towards a second side 265, the second side 265 being opposite the first side 264. Alternatively, the application portion 294 may extend other than from the first side 264 towards the second side 265.

The spring and application portions 292 and 294, respectively, act in a direction transverse to the body section 203. As illustrated, the spring and application portions 292 and 294 act in a spring direction X1, the spring direction being from the first side 264 to the second side 265. Additionally, as one skilled in the art will recognize, the extension portion 290 may also act as a member sprung from a transition portion, indicated generally at 244, and, as a result, the spring portion 290 may also act in a direction towards and away from the upper leg 261. The application portion 294 is oriented such that the application portion 294 is in a plane substantially normal to the base leg 260. Alternatively, the spring direction X1 may be other than from the first side 264 to the second side 265.

Figure 8:
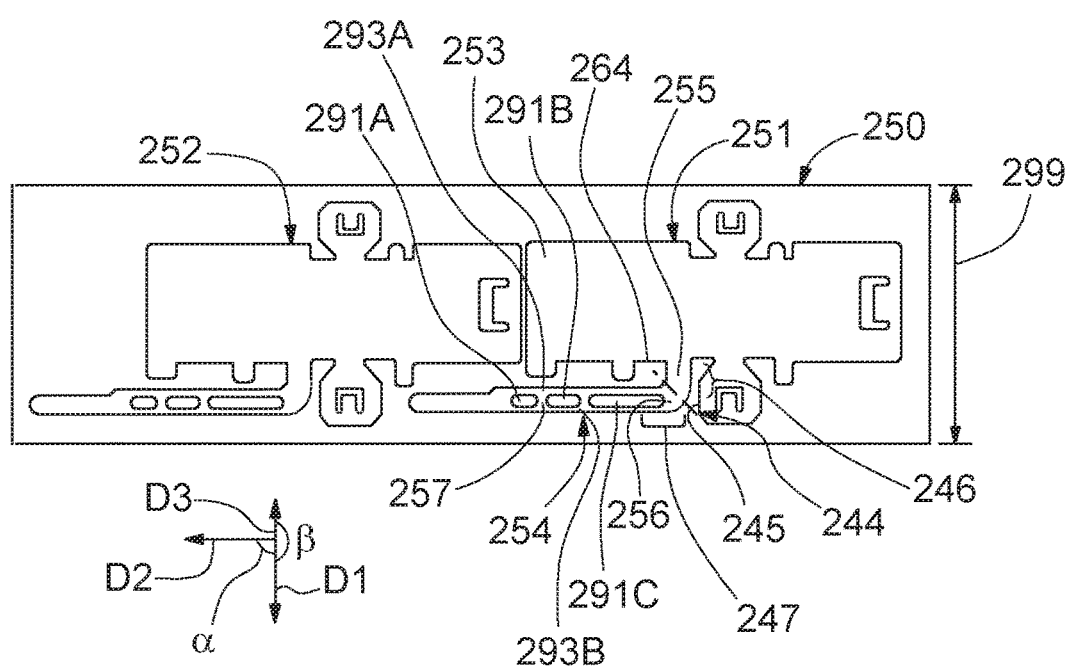
FIG. 8 is a plan view of a material strip used in fabrication of the first embodiment of the brake clip illustrated in FIG. 3.

The spring portion 292 includes a plurality of openings, indicated generally at 291. As illustrated as best shown in FIG. 8, the openings 291 include first, second, and third openings 291A, 291B, and 291C, respectively, best shown in FIG. 8. Between the first and second openings 291A and 291B, respectively, is a first bridging portion 293A and between the second and third openings 291B and 291C, respectively, is a second bridging portion 293B. The first bridging portion 293A is positioned on a spring portion first leg 295A of the spring portion 292, the second bridging portion 293B is positioned on a spring portion second leg 295B, and the second opening 291B is positioned at an apex portion, indicated generally at 297, of the spring portion 292. The apex portion 297 is between the spring portion first and second legs 295A and 295B, respectively.

The spring portion 292 is illustrated as a plurality of elastically deformable spring arms that allow the application portion 294 to move about the body section 203 in three dimensions. It should be appreciated, however, that the spring portion 292 can be any elastically deformable structure as desired. As one skilled in the art will understand, the material makeup and/or structure of the spring portion 292 may be modified to produce or limit movement of the extension portion 290.

Thus, the extension portion 290 is configured to retract the brake pad from contact with a brake rotor (not shown) when a brake pedal (not shown) has been released. The extension portion 290 retracts the brake pad (not shown) by pulling the brake pad towards the first side 264. The spring portion 292 of the extension portion 290 includes the transition portion 244. The transition portion 244 has a bend 245 between first and second legs 246 and 247, respectively, and will be discussed further.

Referring now to FIG. 7, there is illustrated the brake clip 202 in an installed position. As shown therein, in this position a guide rail 240A (shown in phantom), of the backing plate is in contact with a portion of the application portion 294 and at the same time biases (downwardly in FIG. 7), the application portion 294. Also, the contact lip 296 captures or restrains a portion of the guide rail 240A. When the guide rail 240 is installed on the brake clip 202, the guide rail 240A displaces the extension portion 290 away from the first side 264 and towards a second side 265—i.e., the extension portion 290 is displaced leftwardly in FIG. 7, the second side 265 being opposite the first side 264. This displacement tensions the spring portion 292.

Referring now to FIG. 8, there is illustrated a blank or material strip, indicated generally at 250, from which preferably a plurality of individual material blanks, which are configured for use in producing the brake clip 202, are formed. Illustrated are representative first and second material blanks, indicated generally at 251 and 252. The brake clip 202 is fabricated from any of the plurality of individual material blanks using a suitable means known to those skilled in the art. For example, the brake clip 202 may be fabricated from the first material blank 251 by a stamping operation.

The first material blank 251 comprises a first or main blank body 253 for fabricating the body section 203 of the brake clip 202 and, extending from the blank body 253, a second or strip blank portion, indicated generally at 254, for fabricating the extension portion 290 of the brake clip 202. The strip portion 254 comprises a first portion 255, which is connected to and extends from the blank body 253 in a first direction D1 and second and third portions 256 and 257, respectively, which are connected to the first portion 255 via the bend 245 so as to extend in a second direction D2 relative to the first portion 255, the second direction D2 being angled from the first direction D1. As illustrated, the second direction D2 is substantially perpendicular to the first direction D1 but may be other than substantially perpendicular to the first direction D1.

The first leg 246 of the transition portion 244 is formed from the first portion 255 and the second leg 247 of the transition portion 244 is formed from the second portion 256. The bend 245 is formed about a connecting interface (shown as a dashed line in FIG. 8) between the first and second portions 255 and 256, respectively. The spring portion 292, application portion 294, and contact lip 296 are formed from the third portion 257. A first angle α is between the first direction D1 and the second direction D2. The bend 245 also has the first angle α. As the first angle α increases, a width 299 of the blank strip 250 decreases.

Formation of the transition portion 244 redirects or moves the third portion 257 from extending in the second direction D2 to extending in the first direction D1. Formation of the spring portion 292 then redirects or moves the third portion 257 from the first direction to a third direction D3. As illustrated, the third direction D3 is opposite to the first direction D1 and perpendicular to the second direction D2. Alternatively, the third direction D3 may be other than opposite to the first direction D1. As one skilled in the art will readily understand, as the first angle α is varied a second angle β between the first and third directions D1 and D3, respectively, also changes in proportion to the change of the first angle α.

When the strip 250 is metallic, the strip 250 and the first and second material blanks 251 and 252, respectively, should be oriented such that grain of the strip 250 runs in a direction from the second material blank 252 towards the first material blank 251.

Figure 9:
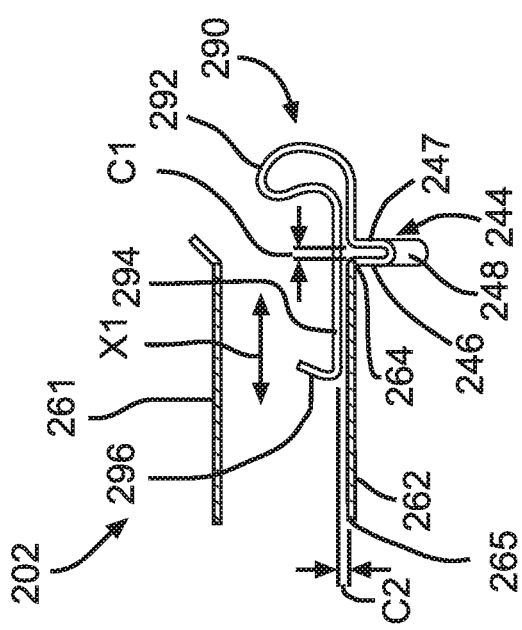
FIG. 9 is a partial sectional view taken along line 9-9 of FIG. 6.

Referring now to FIG. 9, there is illustrated a portion of the brake clip 202 taken through line 9-9 of FIG. 6. As shown therein, there is a "horizontal" clearance or gap C1 between the first and second legs 246 and 247, respectively. The lower leg 262 and application portion 294 extend generally parallel to each other between the first and second sides 264 and 265, respectively. The transition portion 244 and spring portion 292 extend generally perpendicular to the lower leg 262 and application portion 294. As illustrated, the transition portion 244 extends downwardly from the lower leg 262 and the spring portion 292 extends upwardly from the application portion 294 such that the transition portion 244 and the spring portion 292 extend in generally opposite directions. Alternatively, the transition portion 244 and the spring portion 292 may extend other than as illustrated and described. For example, the transition portion 244 and the spring portion 292 may extend in the same direction—i.e., both upwardly or downwardly in FIG. 9.

The application portion 294 has a primary path of travel in the spring direction X1 when the retractor clip is displaced, for example, by the inboard guide rail 240A. As illustrated, the spring portion 292 is non-linear and generally perpendicular to the path of travel. Alternatively, the spring portion 292 may be non-linear with the path of travel in an orientation other than perpendicular. As a length of the spring portion 292 increases—i.e., the coil shape of the spring portion 292 is enlarged, the spring force developed by the spring portion 292 also increases and the extension portion 290 more quickly approaches a constant spring force value. The spring force for the extension portion 290 also more quickly approaches the spring force constant value as a "vertical" clearance gap C2 between the lower leg 262 and the application portion 294 also increases in size—i.e., the lower leg 262 and the application portion 294 are further separated. Furthermore, as the horizontal clearance gap C1 decreases in size, the spring force for the extension portion 290 more quickly approaches the constant spring force value.

Figure 10:
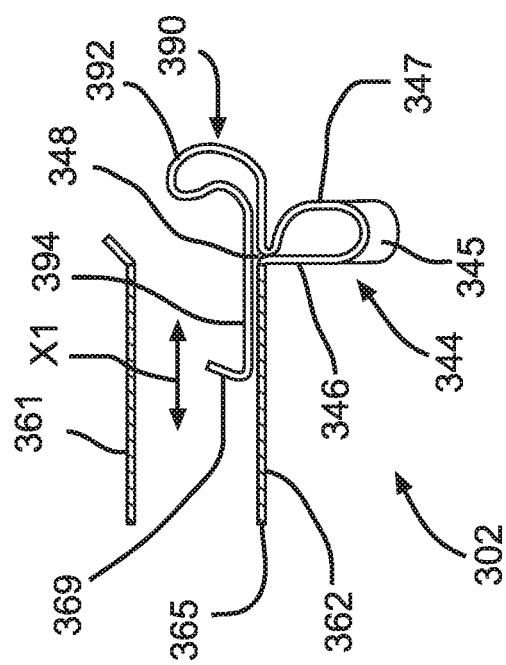
FIG. 10 is a partial sectional view of a second embodiment of a brake clip in accordance with the present invention.

Referring now to FIG. 10, there is illustrated a second embodiment of a brake clip, indicated generally at 302, produced in accordance with the present invention. Because the brake clip 302 is a variation of the brake clip 202 of FIGS. 3-9, like reference numerals, increased by 100, designate corresponding parts in the drawings and detailed description thereof will be omitted.

A second leg 347 of a transition portion 344 extends or expands away from a first leg 346 below an interface 348. As illustrated, the second leg 347 is expanded away from the first leg 346 in a "balloon" shape. Alternatively, the second leg 347 may be expanded in another suitable shape or alignment.

When the extension portion 390 displaces towards a second side 365 (for example, when a guide rail is installed on the brake clip 302), the first and second legs 346 and 347, respectively, transmit force between the first and second legs 346 and 347, respectively, at the interface 348. Otherwise, the first and second legs 346 and 347, respectively, do not make contact at the interface 348 and force is not transmitted between the first and second legs 346 and 347, respectively, at the interface 348.

As the second leg 347 is expanded away from the first leg 346, the second leg 347 more quickly contacts the first leg 346 at the interface 348 and transfers force to the first leg 346 as the extension portion 390 is displaced leftwardly in FIG. 10 towards the second side 365. The second leg 347 more quickly contacting the first leg 346, also more rapidly develops a constant spring force for the extension portion 390.

Figure 11:
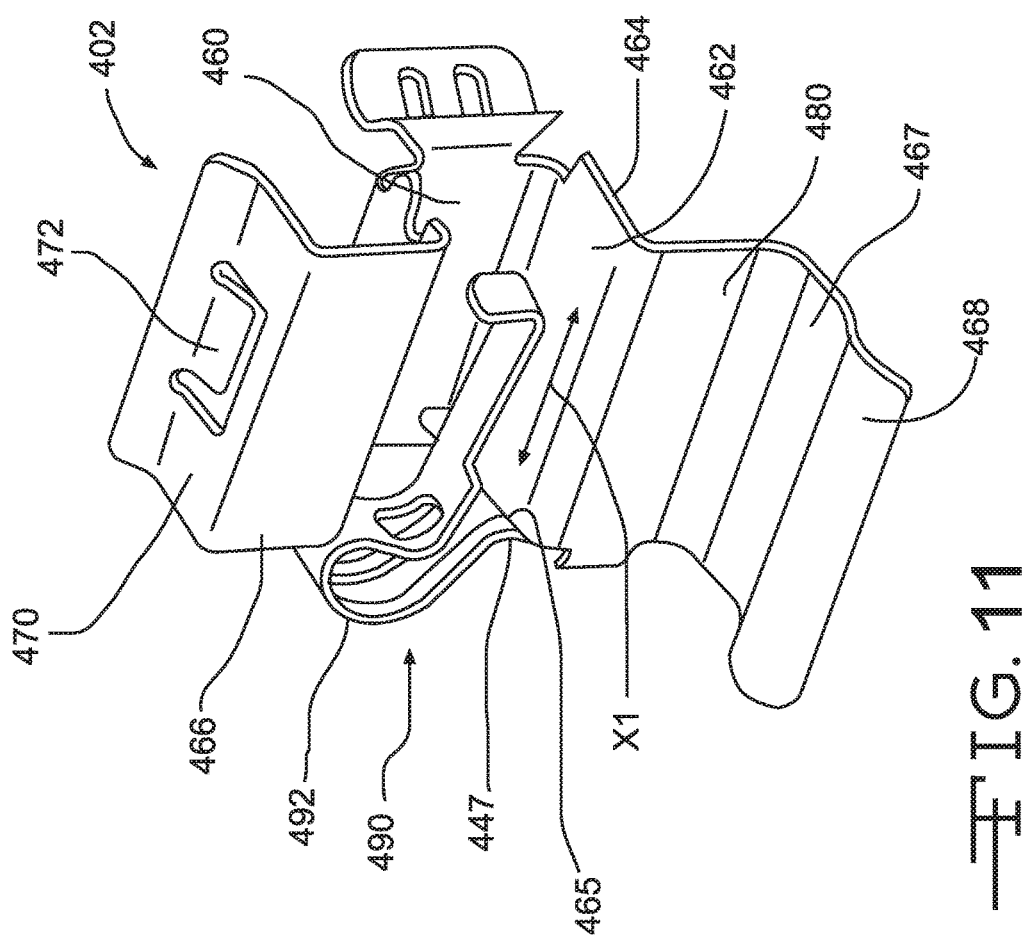
FIG. 11 is a perspective view of a third embodiment of a brake clip in accordance with the present invention in an installed position.
Figure 12:
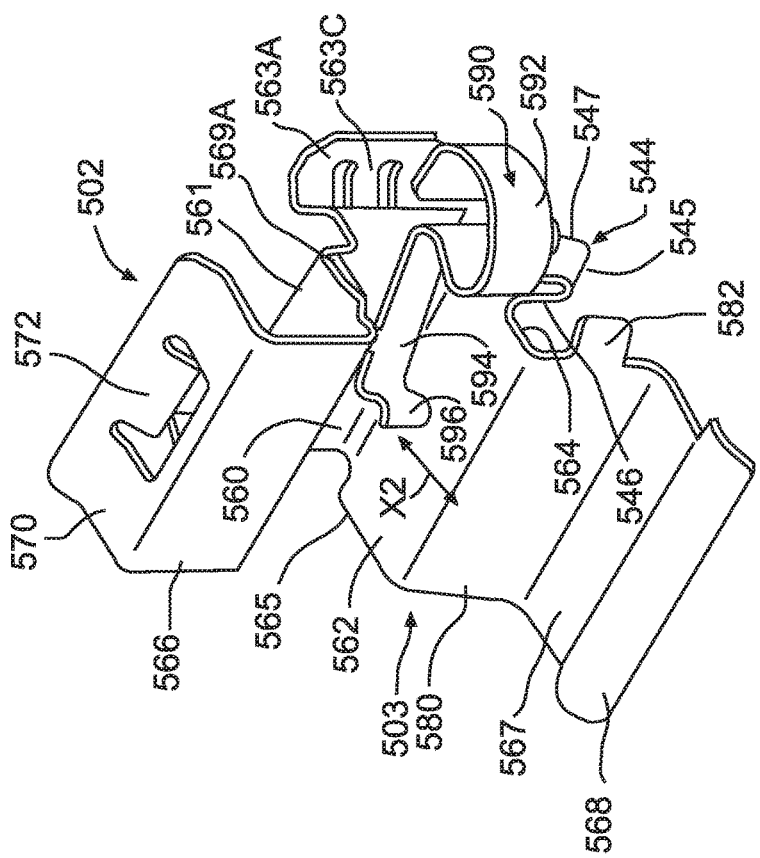
FIG. 12 is a perspective view of a fourth embodiment of a brake clip in accordance with the present invention.
Figure 13:
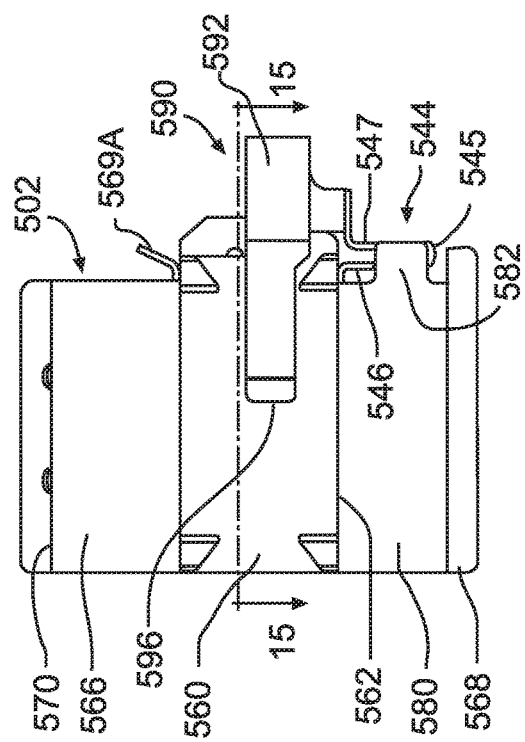
FIG. 13 is a front elevation of the fourth embodiment of the brake clip illustrated in FIG. 12.
Figure 16:
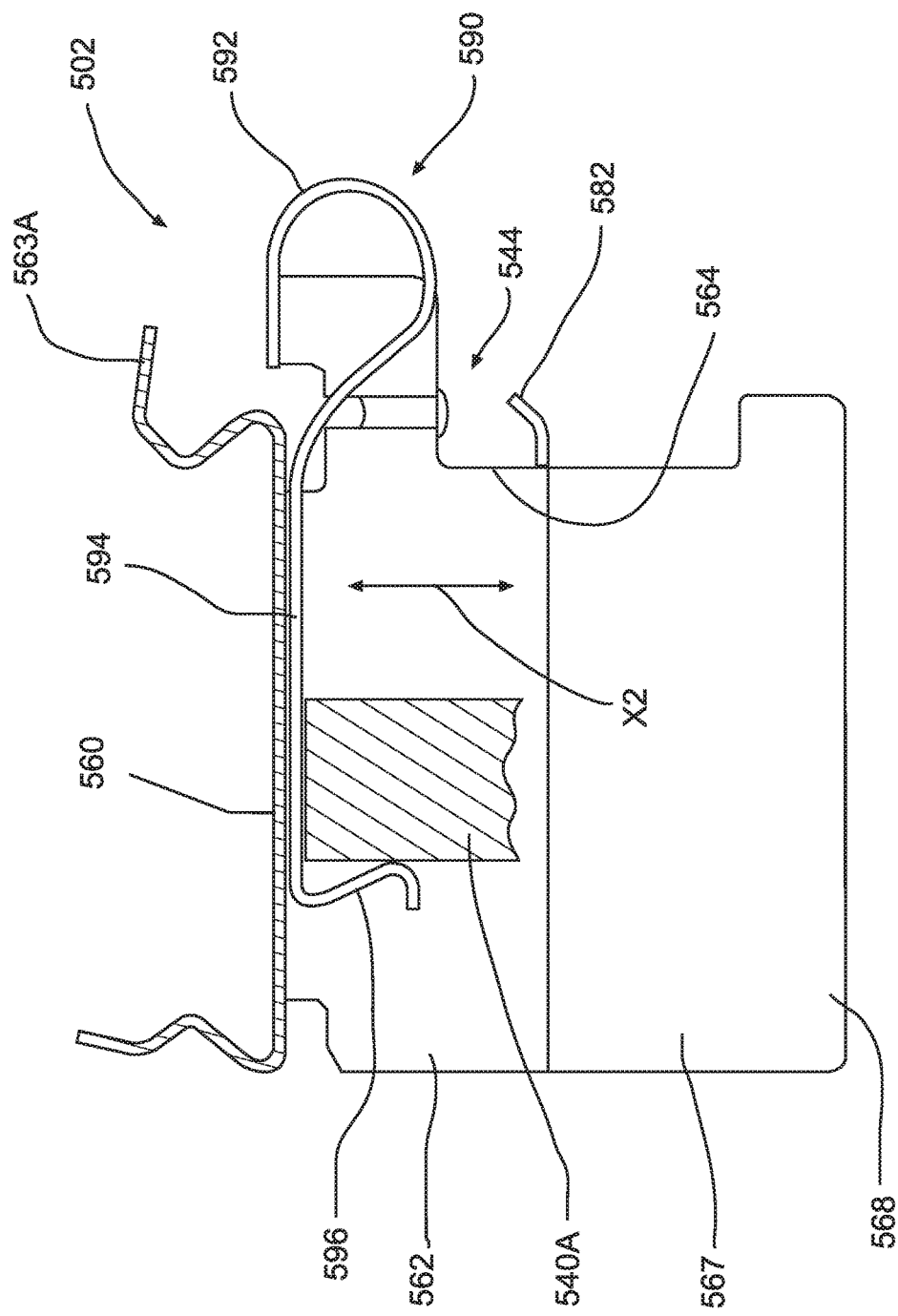
FIG. 16 is a sectional view taken along line 15-15 of FIG. 13 of the fourth embodiment of the brake clip illustrated in FIG. 12 in an installed position.

Referring now to FIG. 11, there is illustrated a third embodiment of a brake clip, indicated generally at 402, produced in accordance with the present invention. Because the brake clip 402 is a variation of the brake clip 202 of FIGS. 3-9, like reference numerals, increased by 200, designate corresponding parts in the drawings and detailed description thereof will be omitted. An extension portion, indicated generally at 490, extends from a second side 465 of a lower leg 462. The second side 465 is opposite a first side 464.

Referring now to FIGS. 12-17, there is illustrated a fourth embodiment of a brake clip, indicated generally at 502, produced in accordance with the present invention. Because the brake clip 502 is a variation of the brake clip 202 of FIGS. 3-9, like reference numerals, increased by 300, designate corresponding parts in the drawings and detailed description thereof will be omitted.

The brake clip 502 has an extension portion, indicated generally at 590 and extending from a body section, indicated generally at 503. As illustrated, the extension portion 590 is a bias clip that extends from a first side 564 of a lower leg 562 of the body section 503. The extension portion 590 includes a spring portion 592, an application portion 594, and a contact lip 596. The application portion 594 applies a spring force generated by the spring portion 592 and extends in a direction transverse to the lower leg 562. As illustrated, the application portion 594 extends generally from the first side 564 towards a second side 565, the second side 565 being opposite the first side 564.

The spring and application portions 592 and 594, respectively, act in a direction generally normal to a base leg 560. As illustrated, the application portion 594 extends generally from the first side 564 towards a second side 565, the second side being opposite the first side 564. The application portion 594 is oriented such that the application portion 594 is in a plane substantially normal to the lower leg 562.

Thus, the extension portion 590 is configured to bias a brake pad (not shown) to a desired position within an anchor bracket (not shown). For example, the brake pad may be biased to a forward or rear position. The spring portion 592 of the extension portion 590 includes a transition portion, indicated generally at 544.

Figure 17:
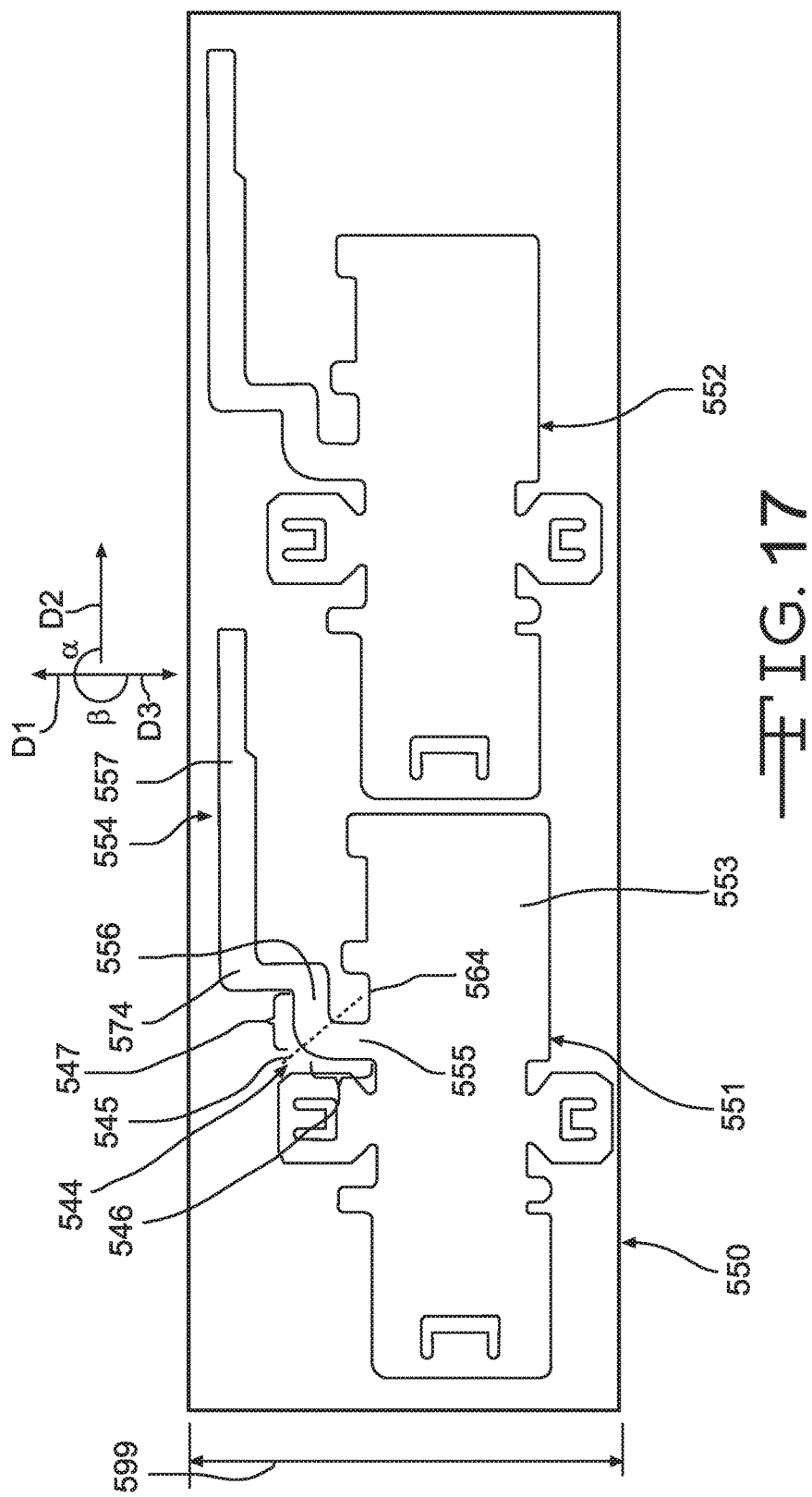
FIG. 17 is a plan view of a material strip used in fabrication of the fourth embodiment of the brake clip illustrated in FIG. 12.
Figure 18:
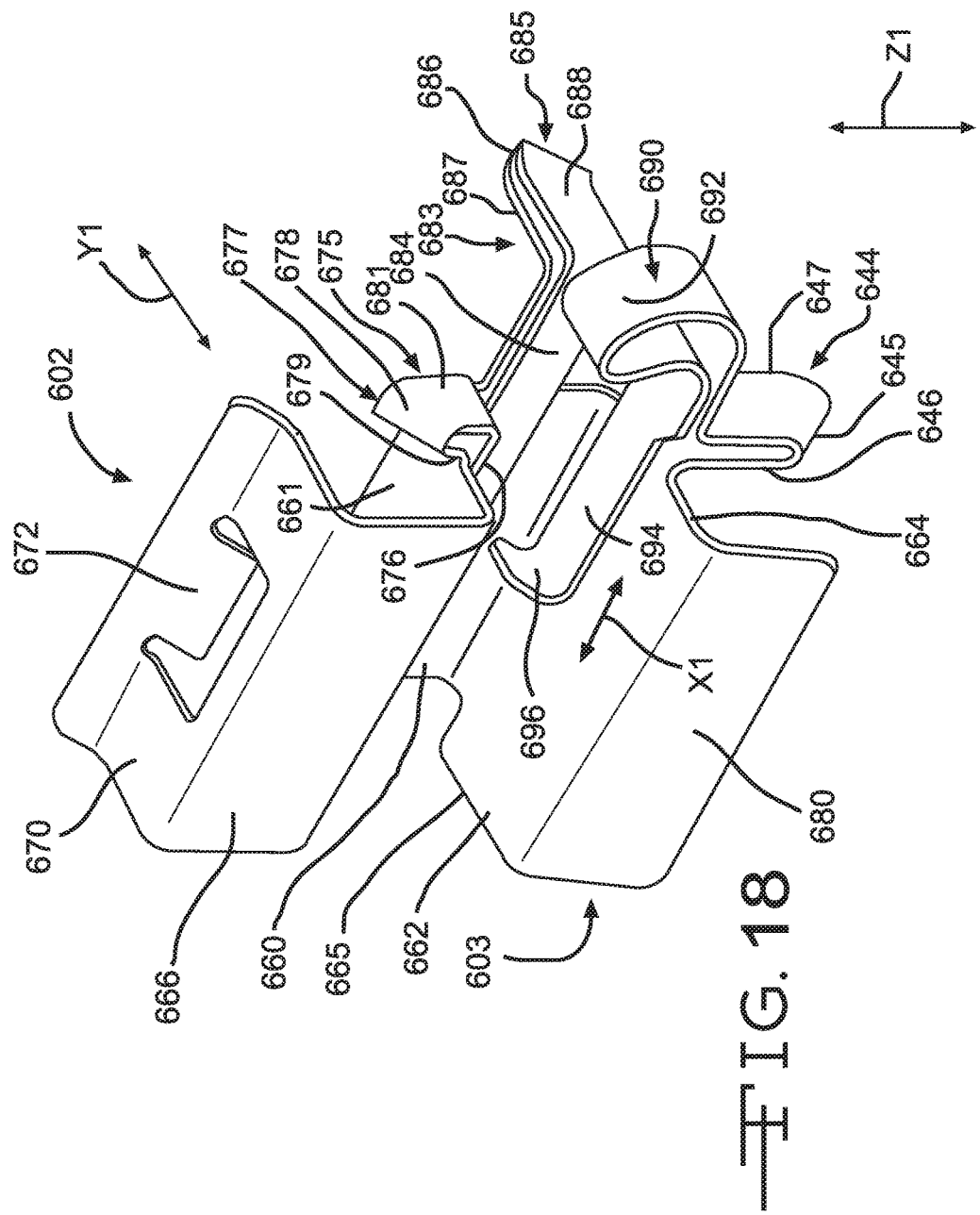
FIG. 18 is a perspective view of a fifth embodiment of a brake clip in accordance with the present invention.
Figure 19:
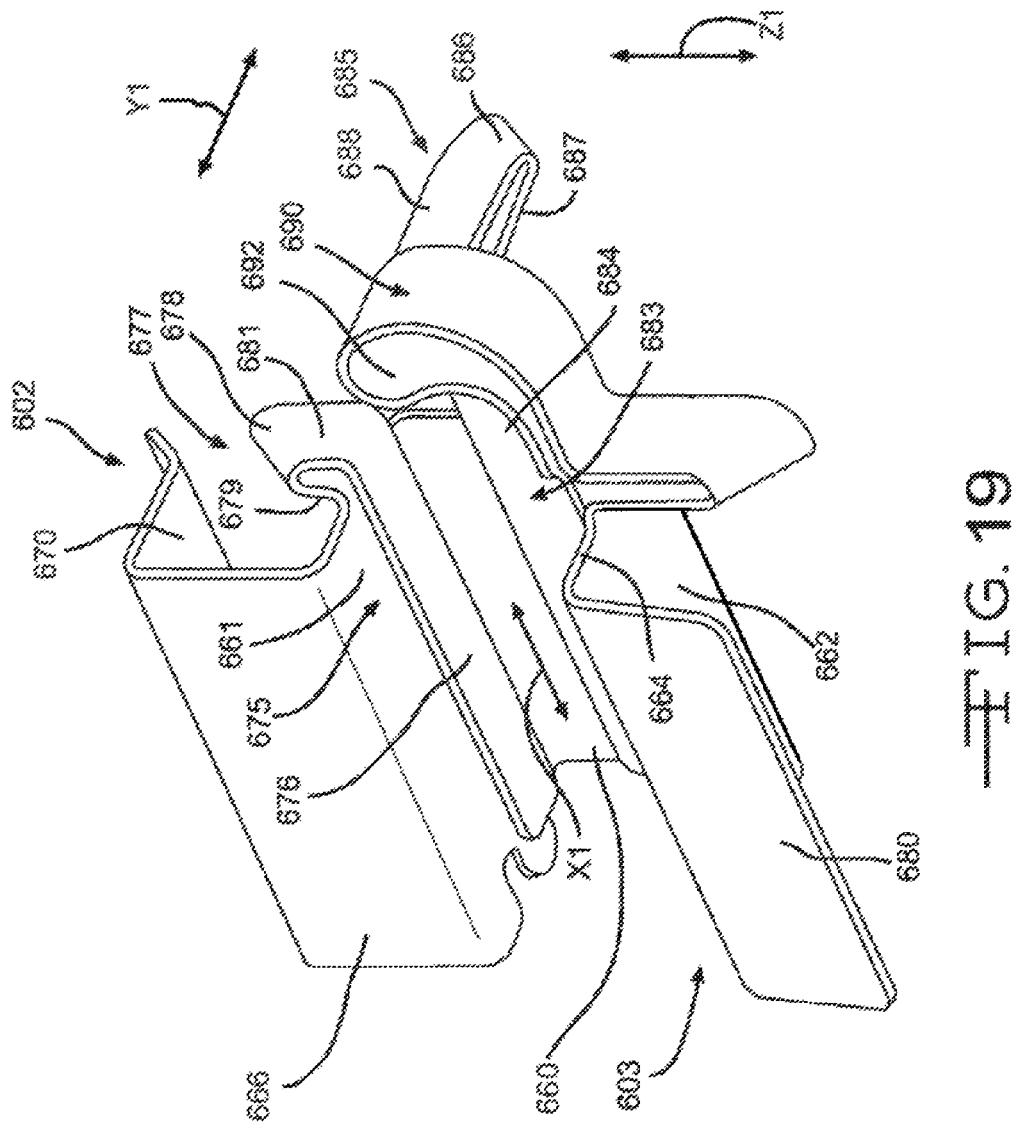
FIG. 19 is a perspective view of the fifth embodiment of the brake clip illustrated in FIG. 18.
Figure 20:
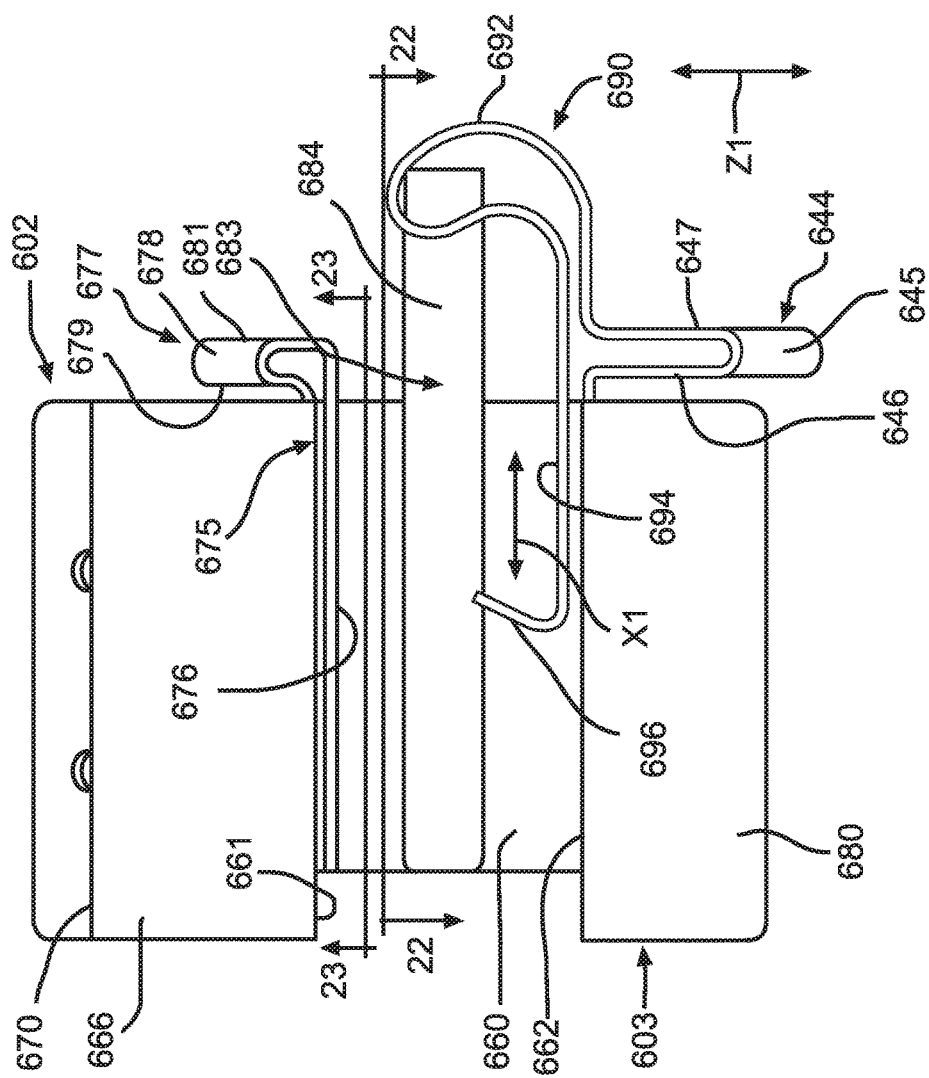
FIG. 20 is a front elevation view of the fifth embodiment of the brake clip illustrated in FIG. 18.
Figure 22:
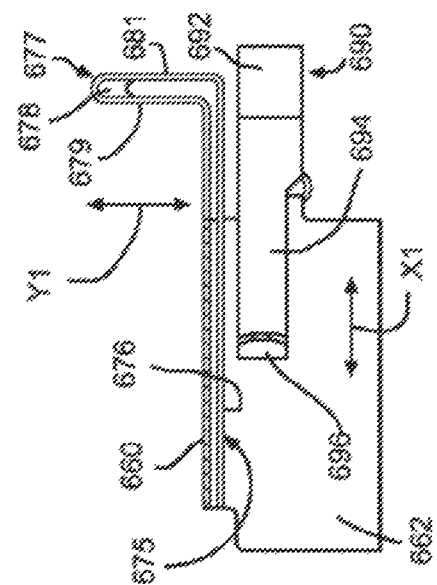
FIG. 22 is a sectional view taken along line 22 of FIG. 20.
Figure 21:
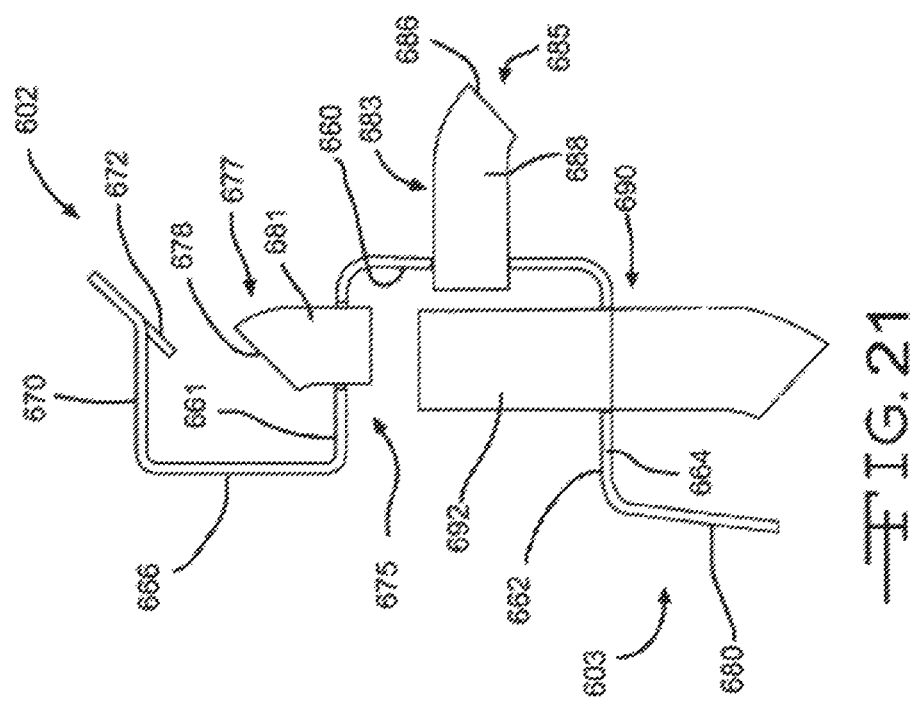
FIG. 21 is a side elevation view of the fifth embodiment of the brake clip illustrated in FIG. 18.
Figure 26:
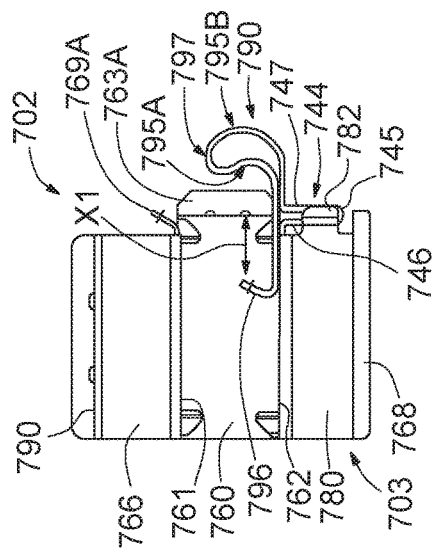
FIG. 26 is a front elevation view of the sixth embodiment of the brake clip illustrated in FIG. 25.
Figure 28:
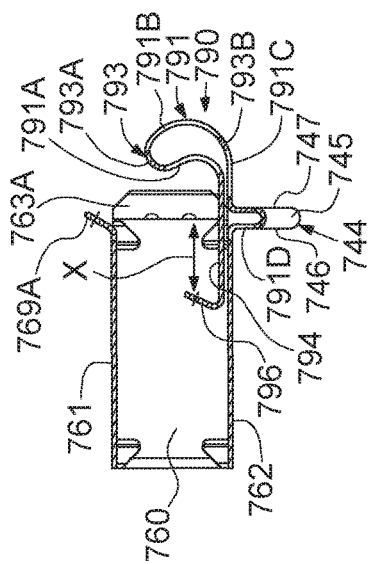
FIG. 28 is a sectional view taken along line 28 of FIG. 27.
Figure 25:
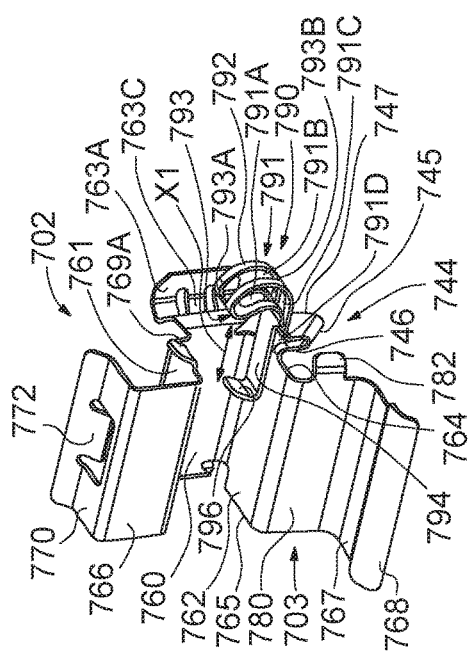
FIG. 25 is a perspective view of a sixth embodiment of a brake clip in accordance with the present invention.
Figure 27:
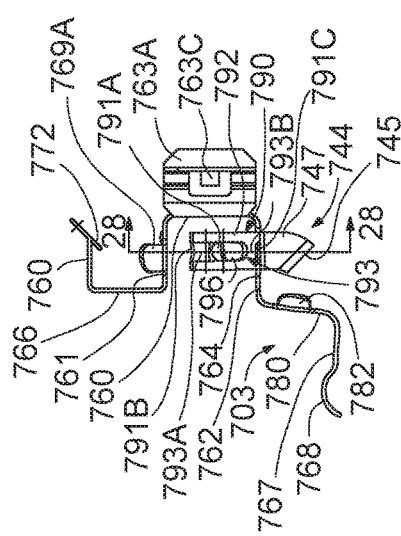
FIG. 27 is a side elevation view of the sixth embodiment of the brake clip illustrated in FIG. 25.
Figure 29:
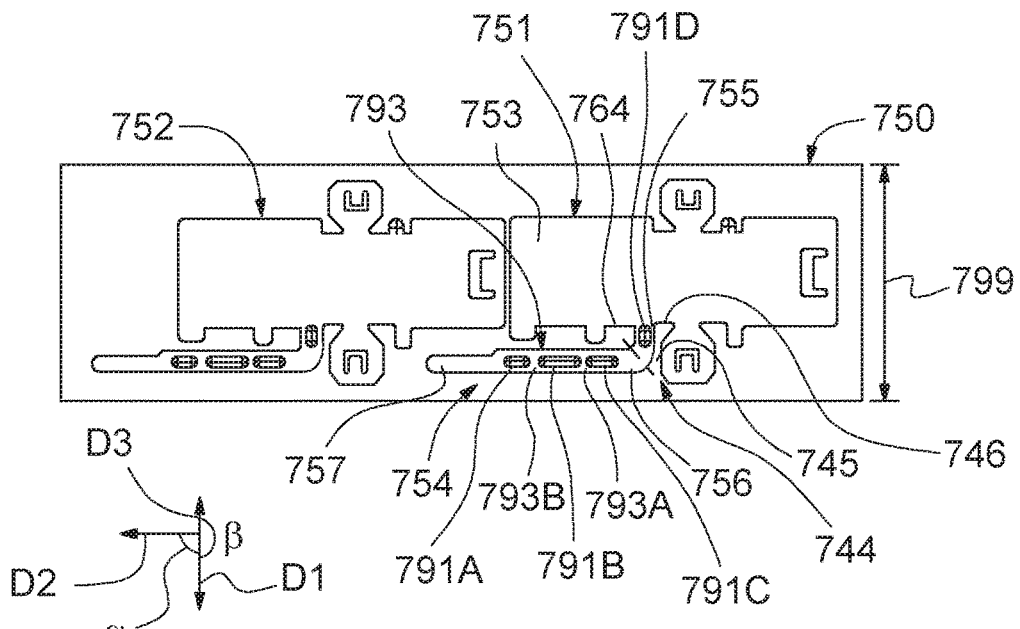
FIG. 29 is a plan view of a material strip used in fabrication of the sixth embodiment of the brake clip illustrated in FIG. 25.

The transition portion 544 has a first leg 546, a first bend 545, a second leg 547, and a second bend 574. The second bend 574 connects the second leg 547 to the spring portion 592. The second bend 574 is configured to redirect or move the spring portion 592 from acting in a direction generally normal to the lower leg 562 to the direction generally normal to the base leg 560. As shown in FIG. 17, the second bend 574 is part of a third portion 557 of a strip portion 554.

Referring now to FIGS. 18-23, there is illustrated a fifth embodiment of a brake clip, indicated generally at 602, produced in accordance with the present invention. Because the brake clip 602 is a variation of the brake clip 202 of FIGS. 3-9, like reference numerals, increased by 400, designate corresponding parts in the drawings and detailed description thereof will be omitted.

The brake clip 602 has a first extension portion, indicated generally at 690, as well as second and third extension portions, indicated at 675 and 683 respectively. The first extension portion 690 extends from a base portion 660, the second extension portion 675 extends from an upper leg 661, and the third extension portion 683 extends from a lower leg 662.

The second extension portion 675 includes a second transition portion, indicated generally at 677, which has a bend 678 between third and fourth legs 679 and 681, respectively. The second extension portion 675 includes a second application portion 676. The third extension portion 683 includes a third transition portion, indicated generally at 685, which has a bend 686 between fifth and sixth legs 687 and 688, respectively. The third extension portion 683 includes a third application portion 684.

The first extension portion 690 applies a spring force in a first direction X1 and, as illustrated, is a retraction clip. The first extension portion 690 pulls a brake pad (not shown) towards a spring portion 692. The second extension portion 675 applies a spring force in a second direction Y1 and, as illustrated, is a tangential bias clip. The third extension portion 683 acts in a third direction Z1 and, as illustrated, is an anti-rattle clip. The tangential bias clip biases the brake pad away from the brake clip 602 and towards a second brake clip (not shown). The anti-rattle clip reduces rattle in a disc brake assembly, of which the brake clip 602 is part.

Alternatively, the first extension portion 690 may be the tangential bias or anti-rattle clips, the second extension portion 675 may be the retraction or anti-rattle clips, and the third extension portion 683 may be the retraction or tangential bias clips. As one skilled in the art will understand, the tangential bias and anti-rattle clips differ only in intended use. Alternatively, the first, second, and third extension portions 690, 675, and 683, respectively, may be such that there are more than one retraction, tangential bias, or anti-rattle clip on the brake clip 602. Alternatively, one or more of the first, second, and third extension portions 690, 675, and 683, respectively, may be omitted.

As illustrated, the first, second, and third extension portions 690, 675, and 683, respectively, extend from a first side 664 of the brake clip 602. Alternatively, the first, second, and third extension portions 690, 675, and 683, respectively, may extend from a second side 665 of the brake clip 602 or from a combination of the first and second sides 664 and 665, respectively.

Referring now to FIG. 24, there is illustrated a blank or material strip, indicated generally at 650, from which preferably a plurality of individual material blanks, which are configured for use in producing the brake clip 602, are formed.

Second and third strip portions, indicated generally at 658 and 659, respectively, extend from a blank body 653 of a first material blank 651. The second strip portion 658 comprises a fourth portion 629, which is connected to and extends from the blank body 653 in a first direction D1 and a fifth portion 631 which is connected to the fourth portion 629 via the bend 678 so as to extend opposite a second direction D2 relative to the fourth portion 629, the second direction D2 being substantially perpendicular to the first direction D1. The third strip portion 659 comprises a sixth portion 637, which is connected to and extends from the blank body 653 in the first direction D1 and a seventh portion 639 which is connected to the sixth portion 637 via the bend 686 so as to extend in a the second direction D2 relative to the sixth portion 637.

The third leg 679 of the second transition portion 677 is formed from the fourth portion 629 and the fourth leg 681 of the second transition portion 677 is formed from the fifth portion 631. The bend 678 is formed about a second connecting interface (shown as a dashed line in FIG. 24) between fourth and fifth portions 629 and 631, respectively. The bend 678 has an angle opposite a first angle α.

The fifth leg 687 of the third transition portion 685 is formed from the sixth portion 637 and the sixth leg 688 of the third transition portion 685 is formed from the seventh portion 639. The bend 686 is formed about a third connecting interface (shown as a dashed line in FIG. 24) between the sixth and seventh portions 637 and 639, respectively. The bend 686 has the first angle α.

A first strip portion, indicated generally at 654, of the first blank 651 is "nested" with a second strip portion 658' of a second blank 652. As illustrated, the first and second blanks 651 and 652, respectively, overlap for an overlap distance 673.

Referring now to FIGS. 25-29, there is illustrated a sixth embodiment of a brake clip, indicated generally at 702, produced in accordance with the present invention. Because the brake clip 702 is a variation of the brake clip 202 of FIGS. 3-9, like reference numerals, increased by 500, designate corresponding parts in the drawings and detailed description thereof will be omitted.

The brake clip 702 has a spring portion 792 that includes a plurality of openings, indicated generally at 791, interspaced with a plurality of bridging portions, indicated generally at 793. As illustrated and best shown in FIG. 29, the openings 791 include first, second, third, and fourth openings 791A, 791B, 791C, and 791D, respectively. Between the first and second openings 791A and 791B, respectively, is a first bridging portion 793A and between the second and third openings 791B and 791C, respectively, is a second bridging portion 793B. The first bridging portion 793A is positioned at an apex portion, indicated generally at 797, of the spring portion 792 and the second bridging portion 793B is positioned at a base portion 798 of the spring portion 792. The fourth opening 791D extends from a first side 794 of a lower leg 762 to a first leg 746 of a transition portion 744.

Figure 30:
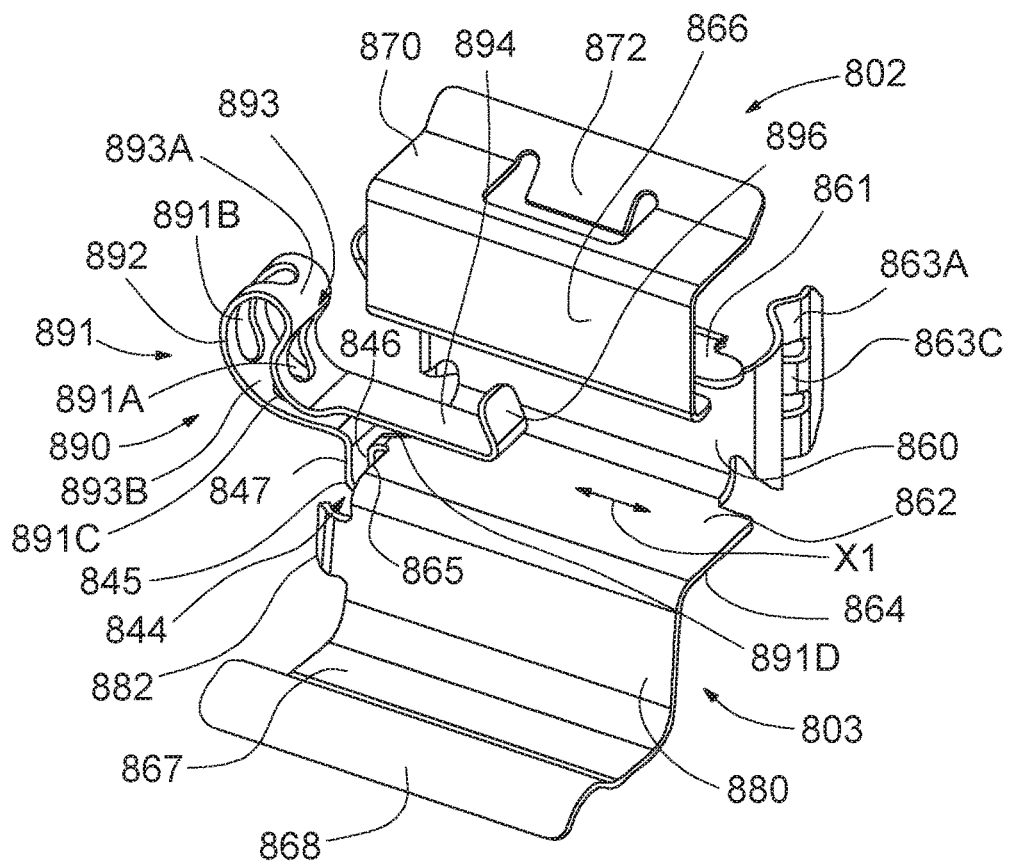
FIG. 30 is a perspective view of a seventh embodiment of a brake clip in accordance with the present invention.

Referring now to FIG. 30, there is illustrated a seventh embodiment of a brake clip, indicated generally at 802, produced in accordance with the present invention. Because the brake clip 702 is a variation of the brake clip 702 of FIGS. 25-29, like reference numerals, increased by 100, designate corresponding parts in the drawings and detailed description thereof will be omitted.

The brake clip 802 further includes an extension portion, indicated generally at 890 extending from a second side 865.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A disc brake assembly comprising:
a brake caliper configured to be slidably supported on an anchor bracket, the brake caliper including at least one brake pad; and
a brake clip disposed between the anchor bracket and the at least one brake pad, the brake clip having:
a U-shaped section having a base leg and opposing upper and lower legs extending from the base leg; and
at least one extension portion having:
a transition portion including first and second legs joined together by a first bend, the first leg of the transition portion configured to be directly connected to a side of the lower leg of the U-shaped section, the transition portion being formed integral with the U-shaped section and the first leg and the second leg are each substantially disposed below a plane defined by the lower leg with the first bend being entirely disposed completely below the lower leg;
a spring portion having a first end configured to be directly connected to the second leg of the transition portion and having a second bend defined between the first end and a second end;
an application portion configured to be directly connected to the second end of the spring portion; and
wherein the at least one extension portion is a retraction clip configured to pull the at least one brake pad across the U-shaped section.

2. A disc brake assembly comprising:
a brake caliper configured to be slidably supported on an anchor bracket, the brake caliper including at least one brake pad; and
a brake clip disposed between the anchor bracket and the at least one brake pad, the brake clip having:
a U-shaped section having a base leg and opposing upper and lower legs extending from the base leg; and
at least one extension portion having:
a transition portion including first and second legs joined together by a first bend, the first leg of the transition portion configured to be directly connected to a side of the lower leg of the U-shaped section, the transition portion being formed integral with the U-shaped section and the first leg and the second leg are each substantially disposed below a plane defined by the lower leg with the first bend being entirely disposed completely below the lower leg;
a spring portion having a first end configured to be directly connected to the second leg of the transition portion and having a second bend defined between the first end and a second end;
an application portion configured to be directly connected to the second end of the spring portion; and
wherein the spring portion extends away from the second leg.

3. The disc brake assembly of claim 1 wherein the at least one extension portion is an anti-rattle clip extending from one of the upper or lower legs and compressing the at least one brake pad against the other of the upper or lower legs.

4. The disc brake assembly of claim 1 wherein the first and second legs are substantially parallel to one another.

5. The disc brake assembly of claim 1 wherein the second leg extends away from the first leg.

6. A disc brake assembly comprising:
a brake caliper configured to be slidably supported on an anchor bracket, the brake caliper including at least one brake pad; and
a brake clip disposed between the anchor bracket and the at least one brake pad, the brake clip having:
a U-shaped section having a base leg and opposing upper and lower legs extending from the base leg; and
at least one extension portion having:
a transition portion including first and second legs joined together by a first bend, the first leg of the transition portion configured to be directly connected to a side of the lower leg of the U-shaped section, the transition portion being formed integral with the U-shaped section and the first leg and the second leg are each substantially disposed below a plane defined by the lower leg with the first bend being entirely disposed completely below the lower leg;
a spring portion having a first end configured to be directly connected to the second leg of the transition portion and having a second bend defined between the first end and a second end;
an application portion configured to be directly connected to the second end of the spring portion; and
wherein the spring portion includes:
a plurality of bridging portions interspaced with a plurality of openings;
first and second spring legs, wherein a first bridging portion of the plurality of bridging portions is in the first spring leg and a second bridging portion of the plurality of bridging portions is in the second spring leg; and
an apex between the first and second spring legs, wherein a first opening of the plurality of openings is at the apex.

7. A disc brake assembly comprising:
a brake caliper configured to be slidably supported on an anchor bracket, the brake caliper including at least one brake pad; and
a brake clip disposed between the anchor bracket and the at least one brake pad, the brake clip having:
a U-shaped section having a base leg and opposing upper and lower legs extending from the base leg; and
at least one extension portion having:
a transition portion including first and second legs joined together by a first bend, the first leg of the transition portion configured to be directly connected to a side of the lower leg of the U-shaped section, the transition portion being formed integral with the U-shaped section and the first leg and the second leg are each substantially disposed below a plane defined by the lower leg with the first bend being entirely disposed completely below the lower leg;
a spring portion having a first end configured to be directly connected to the second leg of the transition portion and having a second bend defined between the first end and a second end;
an application portion configured to be directly connected to the second end of the spring portion; and wherein the spring portion includes:
a plurality of bridging portions interspaced with a plurality of openings;
first and second spring legs, wherein a first opening of the plurality of openings is in the first spring leg and a second opening of the plurality of openings is in the second spring leg; and
an apex between the first and second spring legs, wherein a first bridging portion of the plurality of bridging portions is at the apex.

8. A brake clip for a disc brake assembly, the brake clip comprising:
a brake clip having:
a U-shaped section having a base leg with opposing upper and lower legs extending from the base leg; and
at least one extension portion having:
a transition portion including first and second legs joined together by a first bend, the first leg of the transition portion configured to be directly connected to a side of the lower leg of the U-shaped section, the transition portion being formed integral with the U-shaped section and the first leg and the second leg being substantially disposed below a plane of the lower leg with the first bend being entirely disposed below the plane of the lower leg;
a spring portion having a first end configured to be directly connected to the second leg of the transition portion with a second bend defined between the first end and a second end; and
an application portion configured to be directly connected to the second end of the spring portion wherein the spring portion includes:
a plurality of bridging portions interspaced with a plurality of openings;
first and second spring legs, wherein a first opening of the plurality of openings is in the first spring leg and a second opening of the plurality of openings is in the second spring leg; and
an apex between the first and second spring legs, wherein a first bridging portion of the plurality of bridging portions is at the apex.

9. The brake clip of claim 8 wherein the disc brake assembly includes a brake caliper configured to be slidably supported on an anchor bracket, the brake caliper including at least one brake pad.

* * * * *